US009306966B2

(12) United States Patent
Eskin et al.

(10) Patent No.: US 9,306,966 B2
(45) Date of Patent: *Apr. 5, 2016

(54) METHODS OF UNSUPERVISED ANOMALY DETECTION USING A GEOMETRIC FRAMEWORK

(71) Applicant: The Trustees of Columbia University in the City of New York, New York, NY (US)

(72) Inventors: Eleazar Eskin, Santa Monica, CA (US); Andrew Arnold, Los Angeles, CA (US); Michael Prerau, Chestnut Hill, MA (US); Leonid Portnoy, Brooklyn, NY (US); Salvatore J. Stolfo, Ridgewood, NJ (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 141 days.

This patent is subject to a terminal disclaimer.

(21) Appl. No.: 13/987,690

(22) Filed: Aug. 20, 2013

(65) Prior Publication Data
US 2015/0058982 A1 Feb. 26, 2015

Related U.S. Application Data

(63) Continuation of application No. 12/022,425, filed on Jan. 30, 2008, now Pat. No. 8,544,087, which is a continuation of application No. 10/320,259, filed on Dec. 16, 2002, now abandoned.

(60) Provisional application No. 60/340,196, filed on Dec. 14, 2001, provisional application No. 60/352,894, filed on Jan. 29, 2002.

(51) Int. Cl.
*H04L 29/06* (2006.01)

(52) U.S. Cl.
CPC ................................. *H04L 63/1425* (2013.01)

(58) Field of Classification Search
CPC .................................................. H04L 63/1425
USPC ............................................................ 726/23
See application file for complete search history.

(56) References Cited

U.S. PATENT DOCUMENTS

| 5,278,901 A | 1/1994 | Shieh et al. |
| 5,280,626 A | 1/1994 | Kondo et al. |

(Continued)

FOREIGN PATENT DOCUMENTS

| JP | 11-167533 | 6/1999 |
| JP | 2001-034554 | 2/2001 |

(Continued)

OTHER PUBLICATIONS

Provisional U.S. Appl. No. 60/218,488, filed Jul. 14, 2000.

(Continued)

*Primary Examiner* — Ellen Tran
(74) *Attorney, Agent, or Firm* — Baker Botts L.L.P.

(57) ABSTRACT

A method for unsupervised anomaly detection, which are algorithms that are designed to process unlabeled data. Data elements are mapped to a feature space which is typically a vector space $\Re^d$. Anomalies are detected by determining which points lies in sparse regions of the feature space. Two feature maps are used for mapping data elements to a feature apace. A first map is a data-dependent normalization feature map which we apply to network connections. A second feature map is a spectrum kernel which we apply to system call traces.

23 Claims, 6 Drawing Sheets

(56) References Cited

U.S. PATENT DOCUMENTS

| | | |
|---|---|---|
| 5,448,722 A | 9/1995 | Lynne et al. |
| 5,452,442 A | 9/1995 | Kephart |
| 5,485,575 A | 1/1996 | Chess et al. |
| 5,511,163 A | 4/1996 | Lerche et al. |
| 5,557,742 A | 9/1996 | Smaha et al. |
| 5,621,889 A | 4/1997 | Lermuzeaux et al. |
| 5,649,095 A | 7/1997 | Cozza |
| 5,675,711 A | 10/1997 | Kephart et al. |
| 5,765,170 A | 6/1998 | Morikawa |
| 5,832,208 A | 11/1998 | Chen et al. |
| 5,907,834 A | 5/1999 | Kephart et al. |
| 5,951,698 A | 9/1999 | Chen et al. |
| 5,960,170 A | 9/1999 | Chen et al. |
| 6,006,329 A | 12/1999 | Chi |
| 6,016,546 A | 1/2000 | Kephart et al. |
| 6,108,786 A | 8/2000 | Knowlson |
| 6,161,130 A | 12/2000 | Horvitz et al. |
| 6,263,348 B1 | 7/2001 | Kathrow et al. |
| 6,266,664 B1 | 7/2001 | Russell-Falla et al. |
| 6,275,850 B1 | 8/2001 | Beyda et al. |
| 6,321,338 B1 | 11/2001 | Porras et al. |
| 6,336,109 B2 | 1/2002 | Howard |
| 6,338,141 B1 | 1/2002 | Wells |
| 6,347,374 B1 | 2/2002 | Drake et al. |
| 6,357,008 B1 | 3/2002 | Nachenberg |
| 6,405,318 B1 | 6/2002 | Rowland |
| 6,434,745 B1 | 8/2002 | Conley et al. |
| 6,513,122 B1 | 1/2003 | Magdych et al. |
| 6,519,703 B1 | 2/2003 | Joyce |
| 6,530,024 B1 | 3/2003 | Proctor |
| 6,567,808 B1 | 5/2003 | Eschelbeck et al. |
| 6,594,686 B1 | 7/2003 | Edwards et al. |
| 6,597,777 B1 | 7/2003 | Ho |
| 6,598,076 B1 | 7/2003 | Chang et al. |
| 6,622,134 B1 | 9/2003 | Sorkin |
| 6,647,400 B1 | 11/2003 | Moran |
| 6,671,811 B1 | 12/2003 | Diep et al. |
| 6,681,331 B1 | 1/2004 | Munson et al. |
| 6,694,303 B1 | 2/2004 | Agrawal et al. |
| 6,697,950 B1 | 2/2004 | Ko |
| 6,698,016 B1 | 2/2004 | Ghizzoni |
| 6,704,874 B1 | 3/2004 | Porras et al. |
| 6,735,700 B1 | 5/2004 | Flint et al. |
| 6,735,703 B1 | 5/2004 | Kilpatrick et al. |
| 6,742,124 B1 | 5/2004 | Kilpatrick et al. |
| 6,763,462 B1 | 7/2004 | Marsh |
| 6,769,066 B1 | 7/2004 | Botros et al. |
| 6,772,346 B1 | 8/2004 | Chess et al. |
| 6,775,780 B1 | 8/2004 | Muttik |
| 6,778,995 B1 | 8/2004 | Gallivan |
| 6,785,818 B1 | 8/2004 | Sobel et al. |
| 6,789,202 B1 | 9/2004 | Ko et al. |
| 6,813,682 B2 | 11/2004 | Bress et al. |
| 6,820,081 B1 | 11/2004 | Kawai et al. |
| 6,826,609 B1 | 11/2004 | Smith et al. |
| 6,826,694 B1 | 11/2004 | Dutta et al. |
| 6,839,850 B1 | 1/2005 | Campbell et al. |
| 6,856,694 B2 | 2/2005 | Farmer et al. |
| 6,888,548 B1 | 5/2005 | Gallivan |
| 6,898,712 B2 | 5/2005 | Vignoles et al. |
| 6,907,430 B2 | 6/2005 | Chong et al. |
| 6,910,135 B1 | 6/2005 | Grainger |
| 6,928,549 B2 | 8/2005 | Brock et al. |
| 6,938,161 B2 | 8/2005 | Vignoles et al. |
| 6,957,259 B1 | 10/2005 | Malik |
| 6,963,983 B2 | 11/2005 | Munson et al. |
| 6,970,924 B1 | 11/2005 | Chu |
| 6,971,019 B1 | 11/2005 | Nachenberg |
| 6,973,577 B1 | 12/2005 | Kouznetsov |
| 6,978,274 B1 | 12/2005 | Gallivan et al. |
| 6,983,380 B2 | 1/2006 | Ko |
| 7,007,299 B2 | 2/2006 | Ioele et al. |
| 7,013,483 B2 | 3/2006 | Cohen et al. |
| 7,016,939 B1 | 3/2006 | Rothwell et al. |
| 7,032,031 B2 | 4/2006 | Jungck et al. |
| 7,035,876 B2 | 4/2006 | Kawai et al. |
| 7,039,953 B2 | 5/2006 | Black et al. |
| 7,043,758 B2 | 5/2006 | Grupe |
| 7,065,657 B1 | 6/2006 | Moran |
| 7,065,789 B1 | 6/2006 | Neyman et al. |
| 7,076,527 B2 | 7/2006 | Bellegarda et al. |
| 7,080,076 B1 | 7/2006 | Williamson et al. |
| 7,092,992 B1 | 8/2006 | Yu |
| 7,093,239 B1 | 8/2006 | van der Made |
| 7,146,305 B2 | 12/2006 | van der Made |
| 7,162,741 B2 | 1/2007 | Eskin et al. |
| 7,181,768 B1 | 2/2007 | Ghosh et al. |
| 7,188,367 B1 | 3/2007 | Edwards et al. |
| 7,188,369 B2 | 3/2007 | Ho et al. |
| 7,225,343 B1 | 5/2007 | Honig et al. |
| 7,243,373 B2 | 7/2007 | Muttik et al. |
| 7,272,855 B1 | 9/2007 | Yemeni et al. |
| 7,376,970 B2 | 5/2008 | Marinescu |
| 7,392,543 B2 | 6/2008 | Szor |
| 7,424,619 B1 | 9/2008 | Fan et al. |
| 7,448,084 B1 | 11/2008 | Apap et al. |
| 7,461,402 B1 | 12/2008 | Lyle et al. |
| 7,475,405 B2 | 1/2009 | Manganaris et al. |
| 7,478,077 B2 | 1/2009 | Berger et al. |
| 7,487,544 B2 | 2/2009 | Schultz et al. |
| 7,492,720 B2 | 2/2009 | Pruthi et al. |
| 7,502,939 B2 | 3/2009 | Radatti |
| 7,574,740 B1 | 8/2009 | Kennis |
| 7,607,171 B1 | 10/2009 | Marsden et al. |
| 7,657,935 B2 | 2/2010 | Stolfo et al. |
| 7,735,138 B2 | 6/2010 | Zhao |
| 7,779,472 B1 | 8/2010 | Lou |
| 7,818,797 B1 | 10/2010 | Fan et al. |
| 7,836,503 B2 | 11/2010 | Tarquini et al. |
| 8,108,929 B2 | 1/2012 | Agrawal et al. |
| 8,443,441 B2 | 5/2013 | Stolfo et al. |
| 8,528,086 B1 | 9/2013 | Aziz |
| 8,544,087 B1 | 9/2013 | Eskin et al. |
| 2002/0026605 A1 | 2/2002 | Terry |
| 2002/0046275 A1 | 4/2002 | Crosbie et al. |
| 2002/0059383 A1 | 5/2002 | Katsuda |
| 2002/0059416 A1 | 5/2002 | Tuunanen |
| 2002/0059418 A1 | 5/2002 | Bird et al. |
| 2002/0065892 A1 | 5/2002 | Malik |
| 2002/0082886 A1 | 6/2002 | Manganaris et al. |
| 2002/0083343 A1 | 6/2002 | Crosbie et al. |
| 2002/0133721 A1 | 9/2002 | Adjaoute |
| 2002/0138755 A1 | 9/2002 | Ko |
| 2002/0161763 A1 | 10/2002 | Ye et al. |
| 2002/0197978 A1 | 12/2002 | Zavidniak |
| 2003/0051026 A1 | 3/2003 | Carter et al. |
| 2003/0065926 A1 | 4/2003 | Schultz et al. |
| 2003/0070003 A1 | 4/2003 | Chong et al. |
| 2003/0110274 A1 | 6/2003 | Pazi |
| 2003/0167402 A1 | 9/2003 | Stolfo et al. |
| 2003/0172167 A1 | 9/2003 | Judge et al. |
| 2003/0188189 A1 | 10/2003 | Desai et al. |
| 2004/0172557 A1 | 9/2004 | Nakae et al. |
| 2005/0015624 A1 | 1/2005 | Ginter et al. |
| 2005/0182969 A1 | 8/2005 | Ginter et al. |
| 2005/0188272 A1 | 8/2005 | Bodorin et al. |
| 2006/0080656 A1 | 4/2006 | Cain et al. |
| 2006/0174319 A1 | 8/2006 | Kraemer et al. |
| 2007/0006303 A1 | 1/2007 | Donnelly et al. |
| 2007/0239999 A1 | 10/2007 | Honig et al. |
| 2008/0010251 A1 | 1/2008 | Fontoura et al. |
| 2010/0169970 A1 | 7/2010 | Stolfo et al. |
| 2013/0031633 A1 | 1/2013 | Honig et al. |
| 2013/0239210 A1 | 9/2013 | Stolfo et al. |

FOREIGN PATENT DOCUMENTS

| | | |
|---|---|---|
| JP | 2001-134433 | 5/2001 |
| JP | 2002-342106 | 11/2002 |

(56) References Cited

FOREIGN PATENT DOCUMENTS

| JP | 2004-038273 | 2/2004 |
|---|---|---|
| WO | WO 02/097624 | 12/2002 |
| WO | WO 2007/006994 | 1/2007 |

OTHER PUBLICATIONS

Provisional U.S. Appl. No. 60/244,618, filed Oct. 30, 2000.
Provisional U.S. Appl. No. 60/286,963, filed Apr. 30, 2001.
In the United States District Court for the Eastern District of Virginia Richmond Division: Civil Action No. 3:13-cv-808; *The Trustees of Columbia University in the City of New York v. Symantec Corporation*; Defendant Symantec Corporation's Preliminary Invalidity Contentions Pursuant to Paragraph 4 of the Additional Pretrial Order; Certificate of service date May 12, 2014.
Allen et al., "Detecting signs of Intrusion: Distribution Statement A; Approved for Public Release Distribution Unlimited", *Software Engineering Institute, Carnegie Mellon*, 173 pages (Oct. 2000).
Biermann, et al., "A comparison of intrusion detection systems", *Computers & Security*, 20(8):676-683 (2001).
Cannady, et al., "A comparative analysis of current intrusion detection technologies", *In Proceedings of the Fourth Conference on Technology for Information Security (ISC '96, May)*, 17 pages (1996).
Carr, et al., "Sophos anti-virus detection: a technical overview", *Sophos PLC*, 9 pages (Oct. 2002).
Chen, et al., "When virtual is better than real", *The Eighth IEEE workshop on Hot Topics in Operating Systems, HotOS-VIII*, pp. 116-121 (May 2-23, 2001).
Coates, et al., "Virus detection—The Brainy Way", *Virus Bulletin Conference Proceedings*, pp. 211-216 (1995).
CyberCop Monitor Getting Started Guide, Version 2.0 for Windows NT 4.0, 76 pages (1999).
Centrax® Version 3.1 User's Guide, CyberSafe Corporation, 173 pages (Jun. 2001).
Damp, "An analysis of the effectiveness of a constructive induction-based virus detection prototype", *Department of the Air Force Air University, Air Force Institute of Technology*, 101 pages (Apr. 2000).
De Vel "Mining E-mail Authorship", *KDD-2000 Workshop on Text Mining*, 7 pages (Aug. 2000).
Doumas, et al., "Design of a neural network for recognition and classification of computer viruses", *Computers & Security*, 14:435-448 (1995).
Gao, et al., "Behavioral distance for intrusion detection",*Lecture Notes in Computer Science 3585, Recent Advances in Intrusion Detection, 8th International Symposium, RAID 2005, Seattle, WA*, Sep. 7-9, 2005 3858:63-81 (2006).
Garfinkel, et al., "When virtual is harder than real: Security challenges in virtual machine based computing environments", *HotOS X-Technical Paper*, Retrieved on line https://www.usenix.org/legacy/events/hotos05/prelim_papers/garfinkel/garfinkel_html/ 12 pages retrieved on Mar. 5, 2014.
Guinier, "Computer "virus" identification by neural networks: An artificial intelligence connectionist implementation naturally made to work with fuzzy information", *ACM SIGSAC Review*, 9(4):49-59 (1991).
Harmer, "An distributed agent architecture for a computer virus immune system", *Department of the Air Force Air University, Air Force Institute of Technology*, 202 pages (Mar. 2000).
Hollander, "The future of web server security: Why your web site is still vulnerable to attack", *Entercept Security Technologies, Entercept Web Server Edition*, 27 pages (2000) Retrieved on line https://web.archive.org/web/2011216184530/http://clicknet.com/products/entercept/whitepapers/wpfuture.asp.
Hosmer, et al., "Detecting subtle system changes using digital signatures", *IEEE*, pp. 125-128 (1998).
Internet Security Systems, OS Sensor User Guide, 62 pages (Jan. 2001).
Ho, Swee Yenn (George) "Intrusion Detection—Systems for today and tomorrow", SANS Institute, SANS Institute, InfoSec Reading Room, 8 pages (2001).
Jiang, et al., "Virtual playgrounds for worm behavior investigation", *CERIAS Tech Report 2005-24*, 15 pages (2006).
Kephart, et al., "Blueprint for a computer immune system", *Dipankar Dasgupta (Ed.) Artificial Immune Systems and Their Applications*, pp. 242-261, (Oct. 1-3, 1997).
Lamont, et al., "A distributed architecture for a self-adaptive computer virus immune system", *McGraw-Hill Publishing Company, New Ideas in Optimization*, Chapter 11, pp. 167-183, received Dec. 2000.
Lane, et al., "Temporal sequence learning and data reduction for anomaly detection", *AMC Transactions on Information and System Security*, 2(3):295-331 (1999).
LaPadula, "State of the art in anomaly detection and reaction", *MITRE, Center for Integrated Intelligence Systems*, 37 pages (Jul. 1999).
Laureano, et al., "Intrusion detection in virtual machine environments", *Proceedings of the 30th EUROMICRO Conference (EUROMICRO'04)*, pp. 520-525 (2004).
Leitold "Reductions of the general virus detection problem", *Conference Proceedings EICAR International Conference*, pp. 24-30 (2001).
Lindqvist, et al., "eXpert-BSM: A host-based intrusion detection solution for sun solaris", *Proceedings of the 17th Annual Computer Security Applications Conference; IEEE Computer Society*, pp. 240-251 (2001).
McHugh, "Intrusion and intrusion detection", *IJIS*,1:14-35 (2001).
Mori, "Detecting unknown computer viruses—A new approach-", *ISSS, Lecture Notes in Computer Science*, 3233:226-241, Springer (2003).
Robichaux, "Managing the windows NT Registry, Chapter 8: Administering the Windows NT Registry", O'Reilly & Associates, (1998) retrieved on line http://technet.microsoft.com/en-us/library/cc749939(d—printer).aspx on Mar. 6, 2014.
Sanok, "An analysis of how antivirus methodologies are utilized in protecting computers from malicious code", *Proceeding InfoSecCD '05 Proceedings of the 2nd Annual Conference on Information Security Curriculum Development*, pp. 142-144 (2005).
Schultz, et al., "Data mining methods for detection of new malicious executables", *IEEE*, pp. 38-49 (2001).
Schultz, et al., "Data mining methods for detection of new malicious executables", *Preliminary Program 2001 IEEE Symposium on Security and Privacy*, 13 pages, (May 13-16, 2001).
Sequeira, "Intrusion prevention systems: Security's silver bullet?", *Business Communications Review*, pp. 36-41 (2003).
Shavlik, et al., "Evaluating software sensors for actively profiling windows 2000 computer users", *Presented at the Fourth International Symposium on recent Advances in Intrusion Detection (RAID '01)*, 7 pages (2001).
Szor, "The art of computer virus research and defense", *Symantec Press, Addison Wesley Professional*, 614 pages (2005).
Wang, et al., "Virus detection using data mining techniques", *IEEE*, 71-76 (2003).
Zwienenberg, "Heuristic Scanners: Artificial Intelligence?", Virus Bulletin International Conference, Boston Park Plaza Hotel and Towers, Sep. 20-22, 1995, pp. 203-210.
White, et al., "Anatomy of a commercial-grade immune system", retrieved online http://www.research.ibm.com/antivirus/SciPapers/White/Anatomy/anatomy.html, Venue: Proc. Int'l Virus Bulletin Conf., 29 pages, (1999).
Teasuro, et al., "Neural networks for computer virus recognition", *IEEE Expert*, pp. 5-6 (1996).
"ThunderBYTE Plus MIMESweepr—Firewalls Mail attachments" from David Harley to Firewalls@greatCircle.com and ed@aiepress.com, dated: Jan. 23, 1997, Great Circle, retrieved online http://www.greatcircle.com/firewalls/mhonarc/firewalls.199701/msg00670.html, 3 pages, retrieved on Apr. 22, 2014.
ThunderBYTE Anti-Virus Utilities: User Manual, *ESSaSS B. V.*, (TBAV.txt) 172 pages, (1996) (SYMCOL00206298) (symeo1216960).
Forrest, et al., "A sense of self for unix processes", *IEEE*, pp. 120-128 (1996).
Veldman, "Combating viruses heuristically", *Virus Bulletin Conference*, pp. 67-76 (1993).

(56) References Cited

OTHER PUBLICATIONS

"How can you protect against viruses?", MIMEsweeper Review: Business Computer World, Dec. 1996, retrieved on line https://web.archive.org/web/19970124231706/http://www.mimesweeper.integralis.com/Pr retrieve on Apr. 21, 2014.
MIMEsweeper SMTP FAQs, (Jan. 24, 1997) retrieved on line https://web.archive.org/web/19970124232123/http://www.mimesweeper.integralis.com/Te retrieved on Apr. 21, 2014.
MIMEsweeper FAQ: Our anti-virus tools scan all executable and files on the desktop. doesn't this make MIMEsweeper unnecessary?, (Jan. 24, 1997) retrieved on line http://web.arehive.org/web/19970124232021/http://www.mimesweeper.integralis.com/Pr retrieved on Apr. 21, 2014.
"Combat e-mail viruses and spies", MIMEsweeper Review: PC User, Oct. 1996; retrieved on line http://www.web.archive.org/web/19970124231610/http://www.mirnesweeper.integralis.com/Pr retrieved on Apr. 21, 2014.
MIMESweeper—Lexical Analysis: Prevents export of sensitive information, MIMESweeper, (Jan. 24, 1997) retrieved on line https://web.archivesorg/web/19970124231116/http://www.mimesweeper.integralis.com/Pr retrieved on Apr. 21, 2014.
"MIMESweeper—Secure computing's editor's choice", MIMEsweeper Review: Secure Computing, Sep. 1996, retrieved on line https://web.archive.org/web/19970124231653/http://www.mimesweeper.integralis.com/Pr retrieved on Apr. 21, 2014.
MIMESweeper General FAQs: Starting MIMESweeper gives a 1025error, (Jan. 24, 1997) retrieved on line https://web.archive.org/web/19970124232051/http://wvvw.rnimesweeper.integralis.com/Te retrieved on Apr. 21, 2014.
MIMEsweeper—Virus Detection: Support for industry-standard AV tools, retrieved on line https://web.archive.org/web/19970124231045/http://www.mimesweeper.integralis.com/Pr retrieved on Apr. 21, 2014.
MIMEsweeper—Supported Email Systems: MIMESweeper can operate with the following email systems, retrieved on line https://web.archive.org/web/19970124231019/http://www.mimesweeper.integralis.com/Pr retrieved on Apr. 21, 2014.
Zenkin, "Anti-virus software reports on windows registry changes", *Computer Fraud & Security*, p. 6 (2000).
Cho, et al., "Two sophisticated techniques to improve HMM-based intrusion detection systems", *LNCS, RAID 2003*, 2825:207-219 (2003).
Smaha, "Haystack: An intrusion detection system", *IEEE*, pp. 37-44 (1988).
Sekar, et al., "A specification-based approach for building survivable systems", *National Information Systems Security Conference*, 10 pages (1998).
Ramakrishnan, et al., "Model-based vulnerability analysis of computer systems", *Proceedings of the 2nd International Workshop on Verification, Model Checking and Abstract Interpretation*, 8 pages (1998).
Kephart, et al., "Automatic extraction of computer virus signatures", *Proceedings of the 4th Virus Bulletin International conference, R. Ford ed., Virus Bulleting Ltd, Abingdon, England*, pp. 179-194 (1994).
Javitz and Valdes, "The NIDES Statistical Component Description and Justification", *Annual Report, A010, Prepared for: Department of the Navy Space and Naval Warfare Systems Command*, 52 pages, (Mar. 7, 1994).
Hochberg, et al., "NADIR: A protype system for detecting network and file system abuse", *Submitted to: information Systems Security, Audit, and Control, Brussels, Belgium*, pp. 1-22 (Nov. 16-18, 1992).
Nachenberg, "Behavior Blocking: The next step in anti-virus protection", *Symantec Connect Community*, last updated Mar. 19, 2002; retrieved on line http://www.symantec.com/conneet/articles/behavior-blocking-next-step-anti-virus-protection retrieved on May 11, 2014.
"Applications of Data Mining in Computer Security", edited by Daniel Barbara and Sushil Jajodia, *vol. 6 of Kluwer International Series on advances in Information Security*, 264 pages. (2002).
Axelson, "A preliminary attempt to apply detection and estimation theory to intrusion detection", *Department of Computer Engineering Chalmers University of Technology, Goteborg, Sweden*, 11 pages (Mar. 13, 2000).
Lee, et al., "Real time data mining-based intrusion detection", *Proceedings of the 2001 Darpa Information Survivability Conference and Exposition (Discex II)*, 13 pages (2001).
ThunderBYTE Anti-Virus Utilities: User Manual, *ESSaSS B.V.*, 364 pages, (1996).
Mukkamala, et al., "Intrusion detection using an ensemble of intelligent paradigms", *Computer Application*, 28:167-182 (2005).
Liang, et al., "Isolated program execution: An application transparent approach for executing untrusted programs", *Proceedings of the 19th annual Computer Security Applications Conference*, 11 pages (2003).
Lee, et al., "A generic virus detection agent on the internet", *Proceedings of the 30th Annual Hawaii International Conference on System Sciences, IEEE*, vol. 4: 10 pages (1997).
Lane, et al., "Approaches to online learning and concept drift for user identification in computer security", *AAAI Technical Report WS-98-07*, pp. 64-70 (1998).
Kruegel, et al., "On the detection of anomalous system call arguments", *Proceedings 8th European Symposium on Research in Computer Security (ESORICS'03)*, pp. 101-118 (2003).
Kolter, et al., "Dynamic weighted majority: A new ensemble method for tracking concept drift", *Proceedings of the Third International IEEE Conference on Data Mining*, pp. 123130 (2003).
Klinkenberg, et al. "Detecting Concept Drift with support vector machines", *ICML '00 Proceedings of the 17th International Conference on Machine Learning*, pp. 487-494 (2000).
Islam, et al., "A constructive algorithm for training cooperative neural network ensembles", *IEEE Transactions on Neural Networks*, 14(4):820-834 (2003).
Hall, et al., "Comparing pure parallel ensemble creation techniques against bagging", *The Third IEEE International Conference on Data Mining Nov. 19-22, 2003*, 4 pages (2003).
Feng, et al., "Anomaly detection using call stack information", *Proceedings of the 2003 IEEE Symposium on Security and Privacy (SP0 '03)*, 14 pages (2003).
Sekar, et al., "A fast automaton-based method for detecting anomalous program behaviors", *Proceedings of the 2001 IEEE Symposium on Security and Privacy*, 12 pages (2001).
Fan, et al., "Ensemble-based adaptive intrusion detection", *SIAM International Conference on Data Mining*, 18 pages (2002).
Dunlap, et al., "ReVirt: Enabling intrusion analysis through virtual-machine logging and replay", *Proceedings of the 2002 Symposium on Operating Systems Design and Implementation*, 14 pages (2002).
"The Digital Immune System: Enterprise-grade anti-virus automation in the 21st century", *Symantec*, 16 pages (2001).
Szor, "Attacks on Win32", *Virus Bulletin Conference*, pp. 57-84 (1998).
Szor, "Attacks on Win32—Part II", *Virus Bulletin Conference*, pp. 47-68 (2000).
"Press Release: Symantec's antivirus research center responds to mutating macro viruses with bloodhound-macro technology", *Symantec Corporation*, (Sep. 1997) retrieved on line http://www.symantec.com/about/news/release/articlejsp?prid=19970923_03 retrieved on Apr. 2, 2014 (4 pages).
"New Release: Symantec's Norton antivirus 4.0 delivers multi-platform support", *Symantec Corporation*, (Sep. 1997) retrieved on line https://www.symantec.com/press/1997/n970923b.html retrieved on Apr. 2, 2014 (3 pages).
Bergeron, et al., "Static detection of malicious code in executable programs", *International Journal of Requirement Engineering*, 8 pages (2001).
Bergeron, et al., "Static analysis of binary code to isolate malicious behaviors", *Proceedings IEEE 8th International Workshops on Enabling Technologies: Infrastructure for Collaborative Enterprises (WET ICE'99); Jun. 16-18, 1999*; pp. 184-189, (1999).
"Understanding Heuristics: Symantec's Bloodhound Technology", *Symantec Corporation, Symantec White Paper Series*, vol. XXXIV, 17 pages, (1997).

(56) References Cited

OTHER PUBLICATIONS

Kerchen, et al., "Towards a testbed for malicious code detection", *IEEE*, pp. 160-166 (1991).
Burt, "Norton antivirus gold 5.0 review", *The Magazine of the Melbourne PC User Group*, (1999), (3 pages) retrieved on line http://www.melbpc.org.au/pcupdate/9902/9902article2.htm retrieved on Apr. 2, 2014.
"Press Release: Norton antivirus 5.0 deluxe eases online service and support", *Symantec Corporation*, (1998) retrieved on line http://www.symantec.com/about/news/release/article.jsp?prid=19981026_01 retrieved Apr. 2, 2014 (14 pages).
Nachenberg, "Staying ahead of the virus writers: An in-depth look at heuristics", *Virus Bulletin Conference*, pp. 85-98 (1998).
Lo, et al., "mcf: a Malicious Code Filter", *Computers and Security*, 14(6):541-566 (1995) (Work was supported by the US Dept. of Defense May 4, 1994).
Sahami, et al., "A Bayesian approach to filtering junk e-mail", *AAAI Workshop on Learning for Text Categorization*, 8 pages (1998).
Sahami, et al., Bayesian Spam Filter: A Bayesian approach to filtering junk e-mail, *Microsoft*, retrieved on line http://research.microsoft.com/en-us/um/people/horvits/junkfilter.htm, retrieved Apr. 11, 2014 (Abstract).
Arnold, et al., "Automatically generated Win32 heuristic virus detection", *Virus Bulletin Conference*, pp. 51-60 (2000).
Deitrich, "Ensemble Methods in Machine learning", *MCS 2000, LNCS 1857*, pp. 1-15 (2000).
"Multiple Classifier Systems", *Proceedings First International Workshop, MCS 2000, LNCS 1857, Cagliari, Italy, Jun. 21-23, 2000*, 411 pages (2000).
Chan, et al., "Toward parallel and distributed learning by Meta-learning", *AAAI Workshop in Knowledge Discovery in Databases*, 14 pages (1993).
Tsymbal, "The problem of concept drift: definitions and related work", Technical Report TCD-CS-2004-15, Department of Computer Science, Trinity College Dublin, Ireland, Apr. 2004 (available at http://www.cs.ted.ie/publications/tech-reports/reports.04/TCD-CS-2004-15.pdf). (7 pages).
Sidiroglou, et al., "Building a reactive immune system for software services", *USENIX Annual Technical Conference*, 149-161 (2005).
Tandon, et al., "Learning rules from system call arguments and sequences for anomaly detection", *Workshop on Data Mining for Computer Security*, (10 pages) (2003).
Didaci, et al., "Ensemble learning for intrusion detection in computer networks", *Proccedings of the 8th Conference of the Italian Association of Artificial Intelligence (AIAA '02)*, (10 pages) (2002).
Chebrolu, et al., "Feature deduction and ensemble design of intrusion detection system", *Computers & Security*, 24:295-307 (2005).
Chaturvedi, et al., "Improving attack detection in host-based IDS by learning properties of system call arguments", *Proceedings of the IEEE Symposium on Security and Privacy*, (19 pages) (2005).
Breiman, "Random forests", *Statistics Department, University of California*, (35 pages) (1999).
Breiman, "Bagging predictors", *Machine Learning*, 24:123-140 (1996).
Bowyer, et al., "A parallel decision tree builder for mining very large visualization datasets", *IEEE International Conference on Systems, Man, and Cybernetics*, (6 pages) (2000).
Bauer, et al., "An empirical comparison of voting classification algorithms: Bagging, boosting, and variants", *Machine Learning*, 36:105-142 (1999).
Viljanen, "A survey of application level intrusion detection", *Department of Computer Science, University of Helsinki, Technical Report, Series of Publications C, Report C-2004-61*, (35 pages) (2004).
Cardinale, et al., "A constructive induction approach to computer immunology", *THESIS Presented to the Faculty of the Graduate School of Engineering of the Air Force Institute of Technology Air University, Air Education and Training Command*, (243 pages) (1999).
Kephart, et al., "Biologically inspired defenses against computer viruses", *International Conference on Artificial Intelligence*, pp. 985-996 (1995).
Androutsopoulos, et al., "An evaluation of naive Bayesian anti-spam filter", *Proceedings of the workshop on Machine Learning in the New Information Age, G. Potamias, V. Moustakis and M. van Someren (eds.), 11th European Conference on Machine Learning, Barcelona, Spain*, pp. 9-17 (2000).
Damp, "An analysis of the effectiveness of a constructive induction-based virus detection prototype", *Air Force Inst. of Tech. Wright-Patterson AFB OH, Accession No. ADA380616*, Apr. 2000 (Abstract).
Cohen, "Learning tress and rules with set-valued features", *Proceedings of the 13th National Conference on Artificial Intelligence (AAAI-96)*, (9 pages) (1996).
Wilding, "Virus Bulletin: The authoritative international publication on computer virus prevention, recognition and removal", *Virus Bulletin Ltd.*, (20 pages) (1990).
Yeung, et al., "Host-based intrusion detection using dynamic and static behavioral models", *Department of Computer Science Hong Kong University of Science and Technology*, (34 pages) (Nov. 22, 2001).
Ye, "A Markov chain model of temporal behavior for anomaly detection", *Proceedings of the 2000 IEEE Workshop on Information Assurance and Security, US Military Academy*, pp. 171-174 (2000)).
Lee, et al., "A data mining framework for constructing features and models for intrusion detection systems", *Doctor of Philosophy in the Graduate School of Arts and Sciences, Columbia University*, (193 pages) (1999).
Valcarce, et al., "Essense: An experiment in knowledge-based security monitoring and control", *UNIX Security Symposium III Proceedings*, (18 pages) (Sep. 14-16, 1992).
Tripwire Intrusion Detection System 1.3 for LINUX User Manual, *Tripwire, Inc.* (46 pages) (Jul. 27, 1998).
Tripwire for Servers 2.4 User Guide, *Tripwire, Inc.*, (101 pages) (2001).
Tripwire 2.4 Reference Guide, *Tripwire, Inc.*, (127 pages) (2001).
Teng, et al., "Adaptive real-time anomaly detection using inductively generated sequential patterns", *IEEE*, pp. 278-284 (1990).
SunSHIELD Basic Security Module (BSM) Guide, *Sun Microsystems*, (239 pages) (2000).
SunSHIELD Basic Security Module (BSM) Guide, *Sun Microsystems*, (195 pages) (1995).
Shavlik, et al., "Evaluating software sensors for actively profiling windows 2000 computer users", *RAID*, (7 pages) (2001).
Schwartzbard, et al., "A study in the feasibility of performing host-based anomaly detection on windows NT", *Proceedings of the 2nd International Workshop on Recent Advances in Intrusion Detection*, (10 pages) (Sep. 7-9, 1999).
Schonlau, et al., "Detecting masquerades in intrusion detection based on unpopular commands", *Information Processing Letters*, 76:33-38 (2000).
Schonlau, et al., "Computer Intrusion: Detecting Masquerades", *Statistical Science*, 16(1):58-74 (2001).
Murray, "Windows NT event logging", *O'Reilly & Associates, Inc.*, (320 pages) (1998).
Masys, et al., "Protecting clinical data on web client computers: The PCASSO approach", *AMIA, Inc.*, pp. 366-370 (1998).
Mahoney, et al., "Detecting novel attacks by identifying anomalous network packet headers", *Florida Institute of Technology Technical Report CS-2001-2, Department of Computer Sciences Florida Institute of Technology*, (10 pages) (2001).
Lunt, "A survey of intrusion detection techniques", *Computers & Security*, 12:405-418 (1993).
Liao, et al., "Using text categorization techniques for intrusion detection", *Proceedings USENIX Security*, pp. 51-59 (2002).
Li, et al., "Decision tree classifiers for computer intrusion detection", *Parallel and Distributed Computing Practices*, 4(2):179-190 (2001).
LaPadula, "CyberSecurity Monitoring Tools and Projects: A compendium of commercial and government tools and government research projects", *MITRE Center for Integrated Intelligence Systems (MP 00B0000018 Reviosn 3)*, (127 pages) (2000).

(56) References Cited

OTHER PUBLICATIONS

Kremer, "THESIS: Real-time intrusion detection for windows NT based on Navy IT-21 audit policy", *Naval Postgraduate School, Monterey, California*, (61 pages) (Sep. 1999).
Korba, "Windows NT attacks for the evaluation of intrusion detection systems", *Massachusetts Institute of Technology*, (102 pages) (2000).
Kim, et al., "Writing, supporting, and evaluating tripwire: A publically available security tool", *Computer Science Technical Reports*, Paper 1122 (25 pages) (1994).
Kim, et al., "The design and implementation of tripwire: A file system integrity checker", *Computer Science Technical Reports*, Paper 1084 (23 pages) (1993).
Kim, et al., "Experiences with tripwire: Using integrity checkers for intrusion detection", *Computer Science Technical Reports*, Paper 1115 (15 pages) (1994).
"Kane Security Analyst Features & Benefits", *Kane Security Analyst, Intrusion.com, Inc.*, (2000).
"Intrusion.com Products: Enterprise" retrieved on line https://web.archive.org/web/20010214040305/http://www.intrusion.com/Products/enterprise.shtml, Kane Secure Enterprise, Intrusion.com Inc., (2001) (symco100204438) (213702).
Intrusion.com. Products: Features retrieved on line https://web.archive.org/web/20010215021519/http://www.intrusi on.com/Products/kse_features.shtml, Kane Secure Enterprise, Intrusion.com, Inc., (2001).
"Kane Security Detecting Administrator and Super user Misuse", *Kane Secure Enterprise, Intrusion.com, Inc.*, (2000).
"Kane Security Detecting Stolen Passwords", *Kane Secure Enterprise, Intrusion.com, Inc.*, (2000).
"Advancing the Art of Intrusion Detection: The KSE behavioral profiling system", *Kane Secure Enterprise, Intrusion.com, Inc.*, pp. 1-5 (2000).
Hosmer, "Time-lining computer evidence", *IEEE*, pp. 109-112 (1998).
Hoglund, et al., "The "ESSENSE" of intrusion detection: A knowledge-based approach to security monitoring and control", *Proceedings of the 7th International Conference, Austin, Texas*, pp. 201-210 (May 31-Jun. 3, 1994).
Hedbom, et al., "Analysis of the security of windows NT", *Department of Computer Engineering, Chalmers University of Technology*, (97 pages) (1999).
Hedbom, et al., "A security evaluation of a non-distributed version of windows NT", *Proceedings of the 2nd Nordic Workshop on Secure Computer Systems (NORDSEC '97), Epoo, Finland*, (29 pages) (1997).
Ghosh, et al., "Using program behavior profiles for intrusion detection", *Proceedings of the SANS 3rd Conference on Workshop on Intrusion Detection and Network Monitoring*, (7 pages) (1999).
Ghosh, et al., "Two state-based approaches to program-based anomaly detection", *ACSAC '00 Proceedings of the 16th Annual Computer Security Applications*, pp. 21-30 (2000).
Ghosh, et al., "Learning program behavior profiles for intrusion detection", *Proceedings of the Workshop on Intrusion Detection and network Monitoring*, (13 pages) (Apr. 9-12, 1999).
Ghosh, et al., "Detecting anomalous and unknown intrusions against programs", *Proceedings of the 14th Annual Computer Security Applications Conference, Phoenix, IEEE Computer Society Press, Los Alamitos, CA*, pp. 259-267 (1998).
Friedman, et al., "Efficient Bayesian parameter estimation in large discrete domains", *Advances in Neural Information Processing Systems, MIT Press*, (7 pages) (1999).
Forest, et al., "Self-nonself discrimination in a computer", *Proceedings of 1994 IEEE Symposium on Research in Security and Privacy*, (12 pages) (1994).
Flack, et al., "A toolkit for modeling and compressing audit data", *Purdue University, COAST Laboratory*, (25 pages) (1999).
Hollander, "The future of web server security", *Entercept Security Technologies, Entercept Web Server Edition*, (10 pages) (2001).
Endler, et al., "FOCUS on Intrusion Detection: Intrusion detection using Solaris' basic security module", retrieved on line http://www.securityfocus.com/focus/ids/articles/idsbsm.html, retrieved on Oct. 17, 2000.
Endler, "Intrusion detection applying machine learning to Solaris audit data", *Proceedings of the 1998 Annual Computer Security Application Conference (ACSAC), Los Alamitos, CA*, pp. 268-279 (1998).
DuMouchel, "Computer intrusion detection based on Bayes factors for comparing command transition probabilities", *National Institute of Statistical Sciences (NISS)*, Technical Report No. 91 (13 pages) (1999).
Du, et al., "Security relevancy analysis on the registry of windows NT 4.0", *Proceedings of the 15th Annual Computer Security Applications Conference (Acsac '99), IEEE Computer Society*, pp. 331-338 (1999).
Debbabi, et al., "Monitoring of Malicious activity in software systems", *Symposium on Requirements Engineering for Information Security (SREIS)*, (15 pages) (2001).
Dasgupta, "Immunity-based intrusion detection system: A general framework", *Proceedings of 22nd National Information Systems Security Conference, Arlington, VA*, pp. 147-160 (1999).
"A data mining approach for building cost-sensitive and light intrusion detection models—Quarterly Review—Nov. 2000", *North Carolina State University, Columbia University and Florida Institute of Technology*, (90 pages) (2000).
Cohen, "Fast effective rule induction", *Machine Learning: Proceedings of the 12th International Conference*, pp. 115-123 (1995).
Cannady, "An adaptive neural network approach to intrusion detection and response", *School of Computer and Information Sciences Nova Southeastern University*, (181 pages) (2000).
Bell, et al., "Modeling for text compression", *ACM Computing Survey*, 21(4):557-591 (1989).
Barrus, "Intrusion detection in real time in a multi-node, multi-host environment", *Naval Postgraduate School*, (106 pages) (1997).
Bace, "Technology Series: Intrusion detection", *Macmillan Technical Publishing USA*, (365 pages) (2000).
Axelson, "Research in intrusion-detection systems: A survey", *Department of Computer Engineering Chalmers University of Technology*, (93 pages) (Dec. 15, 1998; revised Aug. 19, 1999).
Webb, "Statistical pattern recognition, second edition", *John Wiley & Sons, Ltd.*, (504 pages) (2002).
Webb, "Statistical pattern recognition", *Arnold Publishers and co-published by Oxford university Press Inc.*, (14 pages) (1999).
Mitchell, "Machine learning", *McGraw-Hill Science/Engineering/Math*, (421 pages) (1997).
Langley, "Elements of machine learning", *Morgan Kaufmann Publishers, Inc.*, Chapter 4; Induction of Competitive Concepts, pp. 104-112 (12 pages) (1996).
Hruska, "Computer viruses and anti-virus warfare", *Ellis Horwood Limited*, Chapter 4 (12 pages) (1990).
Prodromidis, et al., "Agent-based distributed learning applied to fraud detection", *Technical Report CUCS-014-99, Columbia University*, (8 pages) (1999).
Buschkes, et al., "How to increase security in mobile networks by anomaly detection", *Proceedings of the 14th Annual computer Security Applications Conference, ACM Special Interest Group on Security, Audit and control, Phoenix, AZ*, (10 pages) (1998).
Lee, et al., "A data mining framework for building intrusion detection models", *Proceedings 1999 IEEE Symposium on Security and Privacy*, pp. 120-132 (1999).
Fan, "Systematic data selection to mine concept-drifting data streams", *ACM KDD '04*, pp. 128-137 (2004).
MIMESweeper System Requirements, (Jan. 24, 1997) retrieved on line https://web.archive.org/web/19970124231030/http://www.mimesweeper.integralis.com/Pr.., retrieved on Apr. 21, 2014.
MIMESweeper FAQ: What email system does MIMESweeper support? (Jan. 24, 1997) retrieved on line https://web.archive.org/web/19970124231813/http://www.mimesweeper.integralis.com/Pr., retrieved on Apr. 21, 2014.

(56) References Cited

OTHER PUBLICATIONS

MIMESweeper FAQ: Can MIMESweeper check internal email?, (Jan. 24, 1997), retrieved on line https://web.archive.org/web/19970124231748/http://www.mimesweeper.integralis.com/Pr. . . , retrieved on Apr. 21, 2014.
MIMESweeper FAQ: What hardware and software do I need to run MIMESweeper?, (Jan. 24, 1997), retrieved on line https://web.archive.org/web/19970124232002/http://www.mimesweeper.integralis.com/Pr.., retrieved on Apr. 21, 2014.
MIMESweeper FAQ: What is MIMESweeper and why do I need it? (Jan. 24, 1997), retrieved on line https://web.archive.org/web/19970124231725/http://www.mimesweeper.integralis.com/Pr.., retrieved on Apr. 21, 2014.
MIMESweeper FAQ: What platform does MIMESweeper work on? (Jan. 24, 1997), retrieved on line https://web.archive.org/web/19970124231738/http://www.mimesweeper.integralis.com/Pr.., retrieved on Apr. 21, 2014.
MIMESweeper FAQ: Where in my email system would MIMESweeper sit? (Jan. 24, 1997), retrieved on line https://web.archive.org/web/19970124231823/http://www.mimesweeper.integralis.com/Pr.., retrieved on Apr. 21, 2014.
MIMESweeper Faq: Why do I need it if I already have a firewall and desktop products?, {Jan. 24, 1997), retrieved on line https://web.archive.org/web/19970124231758/http://www.mimesweeper.integralis.com/Pr.., retrieved on Apr. 21, 2014.
MIMESweeper, Why Windows NT?: Why we built MIMESweeper to run under Windows NT, (Jan. 24, 1997), retrieved on line https://web.archive.org/web/19970124232043/http://www.mimesweeper.integralis.com/Te.., retrieved on Apr. 21, 2014.
MIMESweeper: Email message content security, {Jan. 24, 1997), retrieved on line https://web.archive.org/web/19970124231006/http://www.mimesweeper.integralis.com/Pr.., retrieved on Apr. 21, 2014.
MIMESweeper: Glossary of terms used in MIMESweeper, (Jan. 24, 1997), retrieved on line https://web.archive.org/web/19970124230731/http://www.mimesweeper.integralis.com/G1.., retrieved on Apr. 21, 2014.
MIMESweeper FAQ: How long does MIMESweeper take to process a message?, (Jan. 24, 1997), retrieved on line https://web.archive.org/web/1997012431858/http://www.mimesweeper.integralis.com/Pr, retrieved on Apr. 21, 2014.
MIMESweeper FAQ: How much administration does MIMESweeper require?, (Jan. 24, 1997), retrieved on line https://web.archive.org/web/19970124232010/http://www.mimesweeper.integralis.com/Pr.., retrieved on Apr. 21, 2014.
MIMESweeper: It works with MIMESweeper, (Jan. 24, 1997) retrieved on line https://web.archive.org/web/19970124230641/http://www.mimesweeper.integralis.com/ W.., retrieved on Apr. 21, 2014.
MIMESweeper cc: Mail FAQs, (Jan. 24, 1997), retrieved on line https://web.archive.org/web/19970124232103/http://www.mimesweeper.integralis.corn/Te.., retrieved on Apr. 21, 2014.
MIMESweeper: Product Description: Check out the MIMESweeper FAQ, (Jan. 24, 1997), retrieved on line https://web.archive.org/web/19970124230632/http://www.mimesweeper.integralis.com/Pr., retrieved on Apr. 21, 2014.
Virus Bulletin, ISSN 0956-9979 (Entire article, 16 pages) (Aug. 1989).
Virus Bulletin, ISSN 0956-9979 (Entire article, 16 pages) (Jul. 1989).
Virus Bulletin, ISSN 0956-9979 (Entire article, 16 pages) (Sep. 1989).
Virus Bulletin, ISSN 0956-9979 (Entire article, 20 pages) (Oct. 1989).
Virus Bulletin, ISSN 0956-9979 (Entire article, 20 pages) (Nov. 1989).
Virus Bulletin, ISSN 0956-9979 (Entire article, 18 pages) (Dec. 1989).
Virus Bulletin, ISSN 0956-9979 (Entire article, 20 pages) (Feb. 1990).
Virus Bulletin, ISSN 0956-9979 (Entire article, 16 pages) (Mar. 1990).
Virus Bulletin, ISSN 0956-9979 (Entire article, 20 pages) (Apr. 1990).
Virus Bulletin, ISSN 0956-9979 (Entire article, 20 pages) (May 1990).
Virus Bulletin, ISSN 0956-9979 (Entire article, 20 pages) (Jun. 1990).
Virus Bulletin, ISSN 0956-9979 (Entire article, 20 pages) (Jul. 1990).
Virus Bulletin, ISSN 0956-9979 (Entire article, 24 pages) (Aug. 1990).
Virus Bulletin, ISSN 0956-9979 (Entire article, 24 pages) (Sep. 1990).
Virus Bulletin, ISSN 0956-9979 (Entire article, 20 pages) (Oct. 1990).
Virus Bulletin, ISSN 0956-9979 (Entire article, 24 pages) (Nov. 1990).
Virus Bulletin, ISSN 0956-9979 (Entire article, 24 pages) (Dec. 1990).
Virus Bulletin, ISSN 0956-9979 (Entire article, 28 pages) (Jan. 1991).
Virus Bulletin, ISSN 0956-9979 (Entire article, 20 pages) (Feb. 1991).
Virus Bulletin, ISSN 0956-9979 (Entire article, 20 pages) (Mar. 1991).
Virus Bulletin, ISSN 0956-9979 (Entire article, 28 pages) (Apr. 1991).
Virus Bulletin, ISSN 0956-9979 (Entire article, 20 pages) (May 1991).
Virus Bulletin, ISSN 0956-9979 (Entire article, 24 pages) (Jun. 1991).
Virus Bulletin, ISSN 0956-9979 (Entire article, 44 pages) (Jul. 1991).
Virus Bulletin, ISSN 0956-9979 (Entire article, 28 pages) (Aug. 1991).
Virus Bulletin, ISSN 0956-9979 (Entire article, 24 pages) (Sep. 1991).
Virus Bulletin, ISSN 0956-9979 (Entire article, 28 pages) (Oct. 1991).
Virus Bulletin, ISSN 0956-9979 (Entire article, 24 pages) (Nov. 1991).
Virus Bulletin, ISSN 0956-9979 (Entire article, 28 pages) (Dec. 1991).
Virus Bulletin, ISSN 0956-9979 (Entire article, 24 pages) (Jan. 1992).
Virus Bulletin, ISSN 0956-9979 (Entire article, 28 pages) (Feb. 1992).
Virus Bulletin, ISSN 0956-9979 (Entire article, 24 pages) (Mar. 1992).
Virus Bulletin, ISSN 0956-9979 (Entire article, 28 pages) (Apr. 1992).
Virus Bulletin, ISSN 0956-9979 (Entire article, 24 pages) (May 1992).
Virus Bulletin, ISSN 0956-9979 (Entire article, 28 pages) (Jun. 1992).
Virus Bulletin, ISSN 0956-9979 (Entire article, 20 pages) (Jul. 1992).
Virus Bulletin, ISSN 0956-9979 (Entire article, 28 pages) (Aug. 1992).
Virus Bulletin, ISSN 0956-9979 (Entire article, 24 pages) (Sep. 1992).
Virus Bulletin, ISSN 0956-9979 (Entire article, 24 pages) (Oct. 1992).
Virus Bulletin, ISSN 0956-9979 (Entire article, 28 pages) (Nov. 1992).
Virus Bulletin, ISSN 0956-9979 (Entire article, 24 pages) (Dec. 1992).
Virus Bulletin, ISSN 0956-9979 (Entire article, 24 pages) (Jan. 1993).
Virus Bulletin, ISSN 0956-9979 (Entire article, 24 pages) (Feb. 1993).
Virus Bulletin, ISSN 0956-9979 (Entire article, 24 pages) (Mar. 1993).
Virus Bulletin, ISSN 0956-9979 (Entire article, 24 pages) (Apr. 1993).

(56) References Cited

OTHER PUBLICATIONS

Virus Bulletin, ISSN 0956-9979 (Entire article, 24 pages) (May 1993).
Virus Bulletin, ISSN 0956-9979 (Entire article, 24 pages) (Jun. 1993).
Virus Bulletin, ISSN 0956-9979 (Entire article, 24 pages) (Jul. 1993).
Virus Bulletin, ISSN 0956-9979 (Entire article, 24 pages) (Aug. 1993).
Virus Bulletin, ISSN 0956-9979 (Entire article, 24 pages) (Sep. 1993).
Virus Bulletin, ISSN 0956-9979 (Entire article, 20 pages) (Oct. 1993).
Virus Bulletin, ISSN 0956-9979 (Entire article, 24 pages) (Nov. 1993).
Virus Bulletin, ISSN 0956-9979 (Entire article, 24 pages) (Dec. 1993).
Virus Bulletin, ISSN 0956-9979 (Entire article, 24 pages) (Jan. 1994).
Virus Bulletin, ISSN 0956-9979 (Entire article, 24 pages) (Feb. 1994).
Virus Bulletin, ISSN 0956-9979 (Entire article, 24 pages) (Mar. 1994).
Virus Bulletin, ISSN 0956-9979 (Entire article, 24 pages) (Apr. 1994).
Virus Bulletin, ISSN 0956-9979 (Entire article, 24 pages) (May 1994).
Virus Bulletin, ISSN 0956-9979 (Entire article, 24 pages) (Jun. 1994).
Virus Bulletin, ISSN 0956-9979 (Entire article, 24 pages) (Jul. 1994).
Virus Bulletin, ISSN 0956-9979 (Entire article, 24 pages) (Aug. 1994).
Virus Bulletin, ISSN 0956-9979 (Entire article, 24 pages) (Sep. 1994).
Virus Bulletin, ISSN 0956-9979 (Entire article, 24 pages) (Oct. 1994).
Virus Bulletin, ISSN 0956-9979 (Entire article, 24 pages) (Nov. 1994).
Virus Bulletin, ISSN 0956-9979 (Entire article, 24 pages) (Dec. 1994).
Virus Bulletin, ISSN 0956-9979 (Entire article, 24 pages) (Jan. 1995).
Virus Bulletin, ISSN 0956-9979 (Entire article, 24 pages) (Feb. 1995).
Virus Bulletin, ISSN 0956-9979 (Entire article, 24 pages) (Mar. 1995).
Virus Bulletin, ISSN 0956-9979 (Entire article, 24 pages) (Apr. 1995).
Virus Bulletin, ISSN 0956-9979 (Entire article, 24 pages) (May 1995).
Virus Bulletin, ISSN 0956-9979 (Entire article, 24 pages) (Jun. 1995).
Virus Bulletin, ISSN 0956-9979 (Entire article, 24 pages) (Jul. 1995).
Virus Bulletin, ISSN 0956-9979 (Entire article, 24 pages) (Aug. 1995).
Virus Bulletin, ISSN 0956-9979 (Entire article, 24 pages) (Sep. 1995).
Virus Bulletin, ISSN 0956-9979 (Entire article, 24 pages) (Oct. 1995).
Virus Bulletin, ISSN 0956-9979 (Entire article, 24 pages) (Nov. 1995).
Virus Bulletin, ISSN 0956-9979 (Entire article, 24 pages) Dec. 1995).
Virus Bulletin, ISSN 0956-9979 (Entire article, 24 pages) (Jan. 1996).
Virus Bulletin, ISSN 0956-9979 (Entire article, 24 pages) (Feb. 1996).
Virus Bulletin, ISSN 0956-9979 (Entire article, 24 pages) (Mar. 1996).
Virus Bulletin, ISSN 0956-9979 (Entire article, 24 pages) (Apr. 1996).
Virus Bulletin, ISSN 0956-9979 (Entire article, 24 pages) (May 1996).
Virus Bulletin, ISSN 0956-9979 (Entire article, 32 pages) (Jun. 1996).
Virus Bulletin, ISSN 0956-9979 (Entire article, 28 pages) (Jul. 1996).
Virus Bulletin, ISSN 0956-9979 (Entire article, 24 pages) (Aug. 1996).
Virus Bulletin, ISSN 0956-9979 (Entire article, 24 pages) (Sep. 1996).
Virus Bulletin, ISSN 0956-9979 (Entire article, 24 pages) (Oct. 1996).
Virus Bulletin, ISSN 0956-9979 (Entire article, 24 pages) (Nov. 1996).
Virus Bulletin, ISSN 0956-9979 (Entire article, 24 pages) (Dec. 1996).
Virus Bulletin, ISSN 0956-9979 (Entire article, 24 pages) (Jan. 1997).
Virus Bulletin, ISSN 0956-9979 (Entire article, 24 pages) (Feb. 1997).
Virus Bulletin, ISSN 0956-9979 (Entire article, 24 pages) (Mar. 1997).
Virus Bulletin, ISSN 0956-9979 (Entire article, 24 pages) (Apr. 1997).
Virus Bulletin, ISSN 0956-9979 (Entire article, 28 pages) (May 1997).
Virus Bulletin, ISSN 0956-9979 (Entire article, 24 pages) (Jun. 1997).
Virus Bulletin, ISSN 0956-9979 (Entire article, 24 pages) (Jul. 1997).
Virus Bulletin, ISSN 0956-9979 (Entire article, 24 pages) (Aug. 1997).
Virus Bulletin, ISSN 0956-9979 (Entire article, 24 pages) (Sep. 1997).
Virus Bulletin, ISSN 0956-9979 (Entire article, 24 pages) (Oct. 1997).
Virus Bulletin, ISSN 0956-9979 (Entire article, 20 pages) (Nov. 1997).
Virus Bulletin, ISSN 0956-9979 (Entire article, 16 pages) (Dec. 1997).
Virus Bulletin, ISSN 0956-9979 (Entire article, 28 pages) (Jan. 1998).
Virus Bulletin, ISSN 0956-9979 (Entire article, 24 pages) (Feb. 1998).
Virus Bulletin, ISSN 0956-9979 (Entire article, 24 pages) (Mar. 1998).
Virus Bulletin, ISSN 0956-9979 (Entire article, 24 pages) (Apr. 1998).
Virus Bulletin, ISSN 0956-9979 (Entire article, 28 pages) (May 1998).
Virus Bulletin, ISSN 0956-9979 (Entire article, 24 pages) (Jun. 1998).
Virus Bulletin, ISSN 0956-9979 (Entire article, 24 pages) (Jul. 1998).
Virus Bulletin, ISSN 0956-9979 (Entire article, 24 pages) (Aug. 1998).
Virus Bulletin, ISSN 0956-9979 (Entire article, 24 pages) (Sep. 1998).
Virus Bulletin, ISSN 0956-9979 (Entire article, 24 pages) (Oct. 1998).
Virus Bulletin, ISSN 0956-9979 (Entire article, 24 pages) (Nov. 1998).
Virus Bulletin, ISSN 0956-9979 (Entire article, 20 pages) (Dec. 1998).
Virus Bulletin, ISSN 0956-9979 (Entire article, 20 pages) (Jan. 1999).
Virus Bulletin, ISSN 0956-9979 (Entire article, 24 pages) (Feb. 1999).
Virus Bulletin, ISSN 0956-9979 (Entire article, 24 pages) (Mar. 1999).
Virus Bulletin, ISSN 0956-9979 (Entire article, 24 pages) (Apr. 1999).
Virus Bulletin, ISSN 0956-9979 (Entire article, 24 pages) (May 1999).
Virus Bulletin, ISSN 0956-9979 (Entire article, 24 pages) (Jun. 1999).

(56) References Cited

OTHER PUBLICATIONS

Virus Bulletin, ISSN 0956-9979 (Entire article, 24 pages) (Jul. 1999).
Virus Bulletin, ISSN 0956-9979 (Entire article, 24 pages) (Aug. 1999).
Virus Bulletin, ISSN 0956-9979 (Entire article, 24 pages) (Sep. 1999).
Virus Bulletin, ISSN 0956-9979 (Entire article, 24 pages) (Oct. 1999).
Virus Bulletin, ISSN 0956-9979 (Entire article, 24 pages) (Nov. 1999).
Virus Bulletin, ISSN 0956-9979 (Entire article, 24 pages) (Dec. 1999).
Virus Bulletin, ISSN 0956-9979 (Entire article, 24 pages) (Jan. 2000).
Virus Bulletin, ISSN 0956-9979 (Entire article, 24 pages) (Feb. 2000).
Virus Bulletin, ISSN 0956-9979 (Entire article, 24 pages) (Mar. 2000).
Virus Bulletin, ISSN 0956-9979 (Entire article, 24 pages) (Apr. 2000).
Virus Bulletin, ISSN 0956-9979 (Entire article, 24 pages) (May 2000).
Virus Bulletin, ISSN 0956-9979 (Entire article, 24 pages) (Jun. 2000).
Virus Bulletin, ISSN 0956-9979 (Entire article, 24 pages) (Jul. 2000).
Virus Bulletin, ISSN 0956-9979 (Entire article, 24 pages) (Aug. 2000).
Virus Bulletin, ISSN 0956-9979 (Entire article, 24 pages) (Sep. 2000).
Virus Bulletin, ISSN 0956-9979 (Entire article, 24 pages) (Oct. 2000).
Virus Bulletin, ISSN 0956-9979 (Entire article, 24 pages) (Nov. 2000).
Virus Bulletin, ISSN 0956-9979 (Entire article, 24 pages) (Dec. 2000).
Virus Bulletin, ISSN 0956-9979 (Entire article, 24 pages) (Jan. 2001).
Virus Bulletin, ISSN 0956-9979 (Entire article, 24 pages) (Feb. 2001).
Virus Bulletin, ISSN 0956-9979 (Entire article, 24 pages) (Mar. 2001).
Virus Bulletin, ISSN 0956-9979 (Entire article, 24 pages) (Apr. 2001).
Virus Bulletin, ISSN 0956-9979 (Entire article, 24 pages) (May 2001).
Virus Bulletin, ISSN 0956-9979 (Entire article, 24 pages) (Jun. 2001).
Virus Bulletin, ISSN 0956-9979 (Entire article, 24 pages) (Jul. 2001).
Virus Bulletin, ISSN 0956-9979 (Entire article, 24 pages) (Aug. 2001).
Virus Bulletin, ISSN 0956-9979 (Entire article, 24 pages) (Sep. 2001).
Virus Bulletin, ISSN 0956-9979 (Entire article, 24 pages) (Oct. 2001).
Virus Bulletin, ISSN 0956-9979 (Entire article, 24 pages) (Nov. 2001).
Virus Bulletin, ISSN 0956-9979 (Entire article, 24 pages) (Dec. 2001).
Virus Bulletin, ISSN 0956-9979 (Entire article, 24 pages) (Jan. 2002).
Virus Bulletin, ISSN 0956-9979 (Entire article, 24 pages) (Feb. 2002).
Virus Bulletin, ISSN 0956-9979 (Entire article, 24 pages) (Mar. 2002).
Virus Bulletin, ISSN 0956-9979 (Entire article, 24 pages) (Apr. 2002).
Virus Bulletin, ISSN 0956-9979 (Entire article, 24 pages) (May 2002).
Virus Bulletin, ISSN 0956-9979 (Entire article, 24 pages) (Jun. 2002).
Virus Bulletin, ISSN 0956-9979 (Entire article, 24 pages) (Jul. 2002).
Virus Bulletin, ISSN 0956-9979 (Entire article, 24 pages) (Aug. 2002).
Virus Bulletin, ISSN 0956-9979 (Entire article, 24 pages) (Sep. 2002).
Virus Bulletin, ISSN 0956-9979 (Entire article, 24 pages) (Oct. 2002).
Virus Bulletin, ISSN 0956-9979 (Entire article, 24 pages) (Nov. 2002).
Virus Bulletin, ISSN 0956-9979 (Entire article, 24 pages) (Dec. 2002).
Virus Bulletin, ISSN 0956-9979 (Entire article, 24 pages) (Jan. 2003).
Virus Bulletin, ISSN 0956-9979 (Entire article, 24 pages) (Feb. 2003).
Virus Bulletin, ISSN 0956-9979 (Entire article, 24 pages) (Mar. 2003).
Virus Bulletin, ISSN 0956-9979 (Entire article, 24 pages) (Apr. 2003).
Virus Bulletin, ISSN 0956-9979 (Entire article, 24 pages) (May 2003).
Virus Bulletin, ISSN 0956-9979 (Entire article, 24 pages) (Jun. 2003).
Virus Bulletin, ISSN 0956-9979 (Entire article, 24 pages) (Jul. 2003).
Virus Bulletin, ISSN 0956-9979 (Entire article, 24 pages) (Aug. 2003).
Virus Bulletin, ISSN 0956-9979 (Entire article, 24 pages) (Sep. 2003).
Virus Bulletin, ISSN 0956-9979 (Entire article, 24 pages) (Oct. 2003).
Virus Bulletin, ISSN 0956-9979 (Entire article, 24 pages) (Nov. 2003).
Virus Bulletin, ISSN 0956-9979 (Entire article, 24 pages) (Dec. 2003).
Virus Bulletin, ISSN 0956-9979 (Entire article, 24 pages) (Jan. 2004).
Virus Bulletin, ISSN 0956-9979 (Entire article, 24 pages) (Feb. 2004).
Virus Bulletin, ISSN 0956-9979 (Entire article, 24 pages) (Mar. 2004).
Virus Bulletin, ISSN 0956-9979 (Entire article, 24 pages) (Apr. 2004).
Virus Bulletin, ISSN 0956-9979 (Entire article, 24 pages) (May 2004).
Virus Bulletin, ISSN 0956-9979 (Entire article, 24 pages) (Jun. 2004).
Virus Bulletin, ISSN 0956-9979 (Entire article, 24 pages) (Jul. 2004).
Virus Bulletin, ISSN 0956-9979 (Entire article, 24 pages) (Aug. 2004).
Virus Bulletin, ISSN 0956-9979 (Entire article, 24 pages) (Sep. 2004).
Virus Bulletin, ISSN 0956-9979 (Entire article, 24 pages) (Oct. 2004).
Virus Bulletin, ISSN 0956-9979 (Entire article, 24 pages) (Nov. 2004).
Virus Bulletin, ISSN 0956-9979 (Entire article, 24 pages) (Dec. 2004).
Virus Bulletin, ISSN 0956-9979 (Entire article, 24 pages) (Jan. 2005).
Virus Bulletin, ISSN 0956-9979 (Entire article, 24 pages) (Feb. 2005).
Virus Bulletin, ISSN 0956-9979 (Entire article, 24 pages) (Mar. 2005).
Virus Bulletin, ISSN 0956-9979 (Entire article, 24 pages) (Apr. 2005).
Virus Bulletin, ISSN 0956-9979 (Entire article, 24 pages) (May 2005).
Virus Bulletin, ISSN 0956-9979 (Entire article, 24 pages) (Jun. 2005).
Virus Bulletin, ISSN 0956-9979 (Entire article, 24 pages) (Jul. 2005).
Virus Bulletin, ISSN 0956-9979 (Entire article, 24 pages) (Aug. 2005).

(56) References Cited

OTHER PUBLICATIONS

Virus Bulletin, ISSN 0956-9979 (Entire article, 24 pages) (Sep. 2005).
Virus Bulletin, ISSN 0956-9979 (Entire article, 24 pages) (Oct. 2005).
U.S. Appl. No. 10/320,259 (Abandoned), filed Dec. 16, 2002.
U.S. Appl. No. 10/327,811 (Abandoned), filed Dec. 19, 2002.
U.S. Appl. No. 10/208,402, filed Nov. 30, 2006 Issue Fee payment.
U.S. Appl. No. 10/208,402, filed Aug. 31, 2006 Notice of Allowance.
U.S. Appl. No. 10/208,402, filed May 22, 2006 Response to Non-Final Office Action.
U.S. Appl. No. 10/208,402, filed Feb. 10, 2006 Non-Final Office Action.
U.S. Appl. No. 10/208,432, filed Dec. 23, 2008 Issue Fee payment.
U.S. Appl. No. 10/208,432, filed Nov. 3, 2008 Notice of Allowance.
U.S. Appl. No. 10/208,432, filed Aug. 13, 2008 Amendment and Response to Election Requirement.
U.S. Appl. No. 10/208,432, filed Jul. 30, 2008 Election Requirement.
U.S. Appl. No. 10/208,432, filed Jun. 13, 2008 Response to Non-Final Office Action.
U.S. Appl. No. 10/208,432, filed Mar. 18, 2008 Non-Final Office Action.
U.S. Appl. No. 10/208,432, filed Dec. 28, 2007 Response to Notice of Non-Compliant.
U.S. Appl. No. 10/208,432, filed Nov. 30, 2007 Notice of Non-Compliant.
U.S. Appl. No. 10/208,432, filed Nov. 13, 2007 Response to Non-Final Office Action.
U.S. Appl. No. 10/208,432, filed Jul. 12, 2007 Non-Final Office Action.
U.S. Appl. No. 10/208,432, filed Apr. 23, 2007 Pre-Brief Appeal Conference Decision.
U.S. Appl. No. 10/208,432, filed Mar. 13, 2007 Notice of Appeal and Pre-Brief Conference Request.
U.S. Appl. No. 10/208,432, filed Nov. 14, 2006 Final Office Action.
U.S. Appl. No. 10/208,432, filed Aug. 29, 2006 Response to Non-Final Office Action.
U.S. Appl. No. 10/208,432, filed Mar. 24, 2006 Non-Final Office Action.
U.S. Appl. No. 10/222,632, filed Dec. 8, 2009 Issue Fee payment.
U.S. Appl. No. 10/222,632, filed Sep. 8, 2009 Notice of Allowance.
U.S. Appl. No. 10/222,632, filed Jun. 8, 2009 Response to Non-Final Office Action.
U.S. Appl. No. 10/222,632, filed Dec. 12, 2008 Non-Final Office Action.
U.S. Appl. No. 10/222,632, filed Nov. 13, 2008 Amendment and Request for Continued Examination (RCE).
U.S. Appl. No. 10/222,632, filed Jul. 2, 2008 Final Office Action.
U.S. Appl. No. 10/222,632, filed Mar. 4, 2008 Response to Non-Final Office Action.
U.S. Appl. No. 10/222,632, filed Oct. 11, 2007 Non-Final Office Action.
U.S. Appl. No. 10/222,632, filed Aug. 9, 2007 Pre-Brief Appeal Conference Decision.
U.S. Appl. No. 10/222,632, filed Apr. 26, 2007 Notice of Appeal and Pre-Brief Appeal Conference.
U.S. Appl. No. 10/222,632, filed Feb. 28, 2007 Advisory Action.
U.S. Appl. No. 10/222,632, filed Feb. 5, 2007 Response to Final Office Action.
U.S. Appl. No. 10/222,632, filed Oct. 31, 2006 Final Office Action.
U.S. Appl. No. 10/222,632, filed Aug. 9, 2006 Response to Non-Final Office Action.
U.S. Appl. No. 10/222,632, filed Mar. 7, 2006 Non-Final Office Action.
U.S. Appl. No. 10/269,694, filed Aug. 5, 2008 Issue Fee payment.
U.S. Appl. No. 10/269,694, filed May 5, 2008 Notice of Allowance.
U.S. Appl. No. 10/269,694, filed Apr. 10, 2008 Supplemental Response to Non-Final Office Action.
U.S. Appl. No. 10/269,694, filed Jan. 22, 2008 Response to Non-Final Office Action.
U.S. Appl. No. 10/269,694, filed Sep. 24, 2007 Non-Final Office Action.
U.S. Appl. No. 10/269,694, filed Jun. 22, 2007 Response to Non-Final Office Action.
U.S. Appl. No. 10/269,694, filed Feb. 22, 2007 Non-Final Office Action.
U.S. Appl. No. 10/269,694, filed Nov. 30, 2006 Response to Non-Final Office Action.
U.S. Appl. No. 10/269,694, filed Jun. 28, 2006 Non-Final Office Action.
U.S. Appl. No. 10/269,718, filed Sep. 13, 2010 Issue Fee payment.
U.S. Appl. No. 10/269,718, filed Jun. 14, 2010 Notice of Allowance.
U.S. Appl. No. 10/269,718, filed Mar. 4, 2010 Response to Non-Final Office Action.
U.S. Appl. No. 10/269,718, filed Jan. 29, 2010 Non-Final Office Action.
U.S. Appl. No. 10/269,718, filed Jan. 11, 2010 Amendment and Request for Continued Examination (RCE).
U.S. Appl. No. 10/269,718, filed Jun. 11, 2009 Notice of Appeal.
U.S. Appl. No. 10/269,718, filed Dec. 11, 2008 Final Office Action.
U.S. Appl. No. 10/269,718, filed Aug. 14, 2008 Response to Non-Final Office Action.
U.S. Appl. No. 10/269,718, filed May 16, 2008 Non-Final Office Action.
U.S. Appl. No. 10/269,718, filed Apr. 10, 2008 Amendment after Notice of Appeal.
U.S. Appl. No. 10/269,718, filed Mar. 3, 2008 Pre-Brief Appeal Conference Decision.
U.S. Appl. No. 10/269,718, filed Feb. 19, 2008 Notice of Appeal and Pre-Brief Conference Request.
U.S. Appl. No. 10/269,718, filed Nov. 20, 2007 Final Office Action.
U.S. Appl. No. 10/269,718, filed Sep. 4, 2007 Response to Non-Final Office Action.
U.S. Appl. No. 10/269,718, filed Jun. 1, 2007 Non-Final Office Action.
U.S. Appl. No. 10/269,718, filed Mar. 7, 2007 Amendment and Request for Continued Examination (RCE).
U.S. Appl. No. 10/269,718, filed Sep. 14, 2006 Final Office Action.
U.S. Appl. No. 10/269,718, filed Jun. 29, 2006 Response to Non-Final Office Action.
U.S. Appl. No. 10/269,718, filed Feb. 27, 2006 Non-Final Office Action.
U.S. Appl. No. 10/320,259, filed Feb. 22, 2008 Notice of Abandonment.
U.S. Appl. No. 10/320,259, filed Aug. 10, 2007 Pre-Brief Appeal Conference Decision.
U.S. Appl. No. 10/320,259, filed Jul. 2, 2007 Notice of Appeal and Pre-Brief Conference Request.
U.S. Appl. No. 10/320,259, filed Apr. 2, 2007 Final Office Action.
U.S. Appl. No. 10/320,259, filed Dec. 22, 2006 Response to Non-Final Office Action.
U.S. Appl. No. 10/320,259, filed Aug. 22, 2006 Non-Final Office Action.
U.S. Appl. No. 10/352,342, filed Apr. 10, 2007 Amendment after Notice of Allowance and Issue Fee payment.
U.S. Appl. No. 10/352,342, filed Jan. 10, 2007 Notice of Allowance.
U.S. Appl. No. 10/352,342, filed Nov. 13, 2006 Response to Non-Final Office Action.
U.S. Appl. No. 10/352,342, filed May 12, 2006 Non-Final Office Action.
U.S. Appl. No. 10/352,343, filed Jul. 2, 2008 Issue Fee payment.
U.S. Appl. No. 10/352,343, filed May 22, 2008 Notice of Allowance.
U.S. Appl. No. 10/352,343, filed May 2, 2008 Response to Final Office Action.
U.S. Appl. No. 10/352,343, filed Mar. 18, 2008 Final Office Action.
U.S. Appl. No. 10/352,343, filed Dec. 19, 2007 Response to Non-Final Office Action.
U.S. Appl. No. 10/352,343, filed Jul. 24, 2007 Non-Final Office Action.
U.S. Appl. No. 10/352,343, filed May 11, 2007 Request for Continued Examination (RCE).
U.S. Appl. No. 10/352,343, filed Apr. 11, 2007 Advisory Action.

(56) References Cited

OTHER PUBLICATIONS

U.S. Appl. No. 10/352,343, filed Mar. 12, 2007 Response to Final Office Action.
U.S. Appl. No. 10/352,343, filed Nov. 14, 2006 Final Office Action.
U.S. Appl. No. 10/352,343, filed Aug. 28, 2006 Response to Non-Final Office Action.
U.S. Appl. No. 10/352,343, filed Mar. 23, 2006 Non-Final Office Action.
U.S. Appl. No. 10/327,811, filed Jan. 7, 2010 Notice of Abandonment.
U.S. Appl. No. 10/327,811, filed Jan. 26, 2009 Final Office Action.
U.S. Appl. No. 10/327,811, filed Dec. 10, 2008 Response to Non-Final Office Action.
U.S. Appl. No. 10/327,811, filed Sep. 29, 2008 Non-Final Office Action.
U.S. Appl. No. 10/327,811, filed Aug. 29, 2008 Amendment and Request for Continued Examination (RCE).
U.S. Appl. No. 10/327,811, filed Jun. 6, 2008 Pre-Brief Appeal Conference Decision.
U.S. Appl. No. 10/327,811, filed Mar. 31, 2008 Notice of Appeal and Pre-Brief Conference Request.
U.S. Appl. No. 10/327,811, filed Nov. 2, 2007 Final Office Action.
U.S. Appl. No. 10/327,811, filed Oct. 11, 2007 Response to Non-Final Office Action.
U.S. Appl. No. 10/327,811, filed Jun. 11, 2007 Non-Final Office Action.
U.S. Appl. No. 10/327,811, filed Apr. 23, 2007 Amendment and Request for Continued Examination (RCE).
U.S. Appl. No. 10/327,811, filed Dec. 22, 2006 Final Office Action.
U.S. Appl. No. 10/327,811, filed Sep. 28, 2006 Response to Non-Final Office Action.
U.S. Appl. No. 10/327,811, filed Apr. 25, 2006 Non-Final Office Action.
U.S. Appl. No. 11/805,946, filed Jul. 15, 2013 Non-Final Office Action.
U.S. Appl. No. 11/805,946, filed Mar. 11, 2011 Amendment and Request for Continued Examination (RCE).
U.S. Appl. No. 11/805,946, filed Oct. 18, 2010 Final Office Action.
U.S. Appl. No. 11/805,946, filed Jul. 21, 2010 Response to Non-Final Office Action.
U.S. Appl. No. 11/805,946, filed Feb. 22, 2010 Non-Final Office Action.
U.S. Appl. No. 11/805,946, filed Dec. 28, 2009 Terminal Disclaimer Review Decision.
U.S. Appl. No. 11/805,946, filed Nov. 23, 2009 Response to Non-Final Office Action and Terminal Disclaimer filed.
U.S. Appl. No. 11/805,946, filed Aug. 28, 2009 Non-Final Office Action.
U.S. Appl. No. 12/022,425, filed Aug. 20, 2013 Issue Fee payment.
U.S. Appl. No. 12/022,425, filed May 20, 2013 Notice of allowance.
U.S. Appl. No. 12/022,425, filed Feb. 20, 2013 Response to Non-Final Office Action.
U.S. Appl. No. 12/022,425, filed Oct. 30, 2012 Non-Final Office Action.
U.S. Appl. No. 12/022,425, filed Feb. 24, 2011 Amendment and Request for Continued Examination (Rce).
U.S. Appl. No. 12/022,425, filed Sep. 1, 2010 Final Office Action.
U.S. Appl. No. 12/022,425, filed Jun. 15, 2010 Response to Non-Final Office Action.
U.S. Appl. No. 12/022,425, filed Mar. 11, 2010 Non-Final Office Action.
U.S. Appl. No. 13/573,314, filed Aug. 15, 2013 Non-Final Office Action.
U.S. Appl. No. 12/633,493, filed Apr. 10, 2013 Issue Fee payment.
U.S. Appl. No. 12/633,493, filed Mar. 4, 2013 Notice of Allowance.
U.S. Appl. No. 12/633,493, filed Dec. 10, 2012 Response to Notice of Allowance.
U.S. Appl. No. 12/633,493, filed Aug. 16, 2012 Non-Final Office Action.
U.S. Appl. No. 12/633,493, filed Apr. 11, 2012 Amendment and Request for Continued Examination (RCE).
U.S. Appl. No. 12/633,493, filed Jan. 19, 2012 Final Office Action.
U.S. Appl. No. 12/633,493, filed Nov. 29, 2011 Response to Non-Final Office Action.
U.S. Appl. No. 12/633,493, filed Aug. 1, 2011 Non-Final Office Action.
Y. Singer. "Adaptive Mixtures of Probablistics Transducers", *Neural Computation*, 1977, 9(8): pp. 1711-1734.
Ron, et al., "The Power of Amnesia: Learning Probablistic Automata with Variable Memory Length", *Machine Learning*, 1996, 25: pp. 117-150.
Pereira, et al., "An Efficient Extension to Mixture Techniques for Prediction and Decision Trees", *Machine Learning*, 1999, 36(3): pp. 183-199,.
Marceau, "Characterizing the Behavior of a Program Using Multiple-Length N-Grams." *Proceedings of the New Security Paradigms Workshop 2000*, 2000, pp. 101-110.
Lee, et al., "Information-Theoretic Measures for Anomaly Detection." *Proceedings of the 2001 IEEE Symposium on Security and Privacy*, May 2001, pp. 1-17.
Kymie, et al., "'Why 6?' Defining the Operation Limits of stide, an Anomaly-Based Intrusion Detector." *IEEE Symposium on Security and Privacy 2002*, May 12-15, 2002, pp. 188-201.
Eskin, et al., "Protein Family Classification using Sparse Markov Transducers," *Proceedings of the Eighth International Conference on Intelligent Systems for Molecular Biology, AAAI Press*, Menlo Park, CA, 2000.
Kephart, et al., "Automatic Extraction of Computer Virus Signatures," *4th Virus Bulletin International Conference*, pp. 178-184, 1994.
Kohavi, A study of cross-validation and boot-strap for accuracy estimation and model selection, *IJCAI*, 1995.
Rivest, "The MD5 Message Digest Algorithm." *published as Internet RFC 1321*, Apr. 1992. http://www.freesoft.org/CIE/RFC/1321/.
van den Berg and Philip Guenther, "Procmail." online publication, 2001. http://www.procmail.org.
White, et al., "Anatomy of a Commercial-Grade Immune System," *IBM Research White Paper*, 1999.
Zhang, et al., "Intrusion Detection Techniques for Mobile Wireless Networks," *Wireless Networks*, 9(5):545-556 (2003).
Anderson, et al., "Next-Generation Intrusion Detection Expert Systems (NIDES): A Summary," Technical Report SRI-CSL-95-07, *Computer Science Laboratory* (1995).
Lippman, et al., MIT Lincoln Laboratory "*1998 Intrusion Detection Evaluation*" (1998).
Cohen, "Fast Effective Rule Induction," Proceedings of Machine Learning: Proceedings of the Twelfth International Conference (1995).
Lee, A Data Mining Framework for Constructing Features and Models for Intrusion Detection Systems, Ph.D. Thesis, Columbia University (1999).
Honig, et al., (2002) "Adaptive Model Generation: An Architecture for the Deployment of Data Mining-based Intrusion Detection. Systems." published in Data Mining for Security Applications, Kluwer.
Burroughs, et al., Apr. 2002, "Analysis of Distributed Intrusion Detection Systems Using Bayesian Methods" presented at IPCCC.
Eskin, et al., (2002), "A geometric framework for unsupervised anomaly detection: Detecting intrusions in unlabeled data" Technical Report, CUCS Technical Report.
Apap, et al., (2001) "Detecting malicious software by monitoring anomalous windows registry accesses." Technical Report, CUCS Technical Report.
Mahoney, et al., (2001) "Detecting novel attacks by identifying anomalous network packet headers." Technical Report CS-2001-2, Florida Institute of Technology, Melbourne, FL.
Portnoy, et al., (2001) "Intrusion detection with unlabeled data using clustering." *In Proceedings of ACM CSS Workshop on Data Mining Applied to Security* (DMSA-2001).
Eskin, et al., (2000) "Anomaly detection over noisy data using learned probability distributions." *In Proceedings of the Seventeenth International Conference on Machine Learning* (ICML-2000).

(56) References Cited

OTHER PUBLICATIONS

Lane, et al., (1999) "Temporal sequence learning and data reduction for anomaly detection." *ACM Transactions on Information and System Security*, 2(3):295-331.
Warrender, et al., (1999) "Detecting intrusions using system calls: alternative data models." In *Proceedings of the 1999 IEEE Symposium on Security and Privacy, IEEE Computer Society*, pp. 133-145.
Lee, et al., Aug. 1998, "Mining Audit Data to Build Intrusion Detection Models" In *Proceedings of the Fourth International Conference on Knowledge Discovery and Data Mining* (KDD '98), New York, NY.
Staniford-Chen, et al., Oct. 1998, "The common intrusion detection framework (cidf)." In *Proceedings of the Information Survivability Workshop*.
Lane, et al. (1997) "Sequence Matching and Learning in Anomaly Detection for Computer Security" AAAI Workshop: *AI Approaches to Fraud Detection and Risk Management* pp. 49-49.
Lee, et al., "Learning patterns from UNIX processes execution traces for intrusion detection." In *Proceedings of the AAAI-97 Workshop on AI Approaches to Fraud Detection and Risk Management* pp. 50-56. Menlo Park, CA: AAAI Press. (1997).
Bhattacharya, et al., 2002, "MET: An Experimental System for Malicious Email Tracking" Proceedings 2002 New Security Paradigms Workshop.
Schultz, et al., Jun. 2001, "Mef: Malicious email filter—a unix filter that detects malicious windows executables" http://www.cs.columbia.edu/ids/mef/rel_papers.html, USENIX Annual Technical Conference.
Schultz, et al., May 2001, "Data mining methods for detection of new malicious executables" Proceedings of the IEEE Symposium on Security and Privacy.
Wang, et al., 2000, "On computer viral infection and the effect of immunization" *Proceedings of the 16th ACM Annual Computer Applications Conference*.
White, Oct. 1998, "Open problems in computer virus research" *Online publication*, http://www.research.ibm.com/antivirus/SciPapers/White/Problems, *Virus Bulletin Conference*, pp. 1-11.
Feng, et al., 1994, "Machine Learning of Rules and Trees" *Machine Learning, Neutral and Statistical Classification*, pp. 50-83.
W.O. International, 1993-2003, "PC Viruses in the Wild" http://www.bocklabs.wisc.edu/janda/wildlist.html, pp. 1-15.
Kephart, 1994, "A biologically inspired immune system for computers" *Artificial Life IV, R. Brooks and P. Maes, eds.*, pp. 1-10.
Bron, et al., "Algorithm 457:Finding All Cliques of an Undirected Graph," *Communications of CACM*, 16:575-577, 1973.
Kephart, et al., "Computer and Epidemiology," *IBM Watson Research Center*, 1993, pp. 1-20.
Denning, "An Intrusion Detection Model" *IEEE Transactions on Software Engineering*, SE-13:118-131, 1986.
Lee, et al., "Mining in a Data-flow Environment: Experience in Network Intrusion Detection" *In Proceedings of the 5th ACM SIGKDD International Conference on Knowledge Discovery & Data Mining (KDD-'99)*, San Diego, CA, Aug. 1999.
Hofmeyr, et al., "Intrusion Detect Using Sequences of System Calls," *Journal of Computer Security*, 6:151-180, 1998.
Friedman, et al., "Efficient Bayesian Parameter Estimation in Large Discrete Domains," *Advances in Neural Information Processing Systems 11*, MIT Press, 1999.
Debar, et al., "Intrusion Detection Exchange Format Data Model," *Internet Engineering Task Force*, Jun. 15, 2000.
Javitz, et al., Mar. 7, 1994, "The NIDES statistical component: Description and justification." *Technical Report, SRI International*.
Eskin, et al., "Adaptive Model Generation for Intrusion Detection Systems" *Workshop on Intrusion Detection and Prevention, 7th ACM Conference on Computer Security*, Athens. Nov. 2000.
Korba, "Windows NT Attacks for the Evaluation of Intrusion Detection Systems", *Massachusetts Institute of Technology*, 102 pages, May 2000.
Campbell, et al., "A modular Approach to Computer Security Risk Management," *AFIPS Conference Proceedings*, AFIPS Press, 1979.
Lindqvist, et al., "How to Systematically Classify COmputer Security Intrusions," *Proceedings of the 1997 IEEE Symposium on Research in Security and Privacy*, Oakland, CA, May 1997, pp. 154-163.
Glaseman, et al., "Problem Areas in Computer Security ASsessment," *Proceedings of the National Computer Conference*, 1977.
Northcutt, Intrusion Detection: An Analyst's Handbook, New Riders, 1999, pp. 39-40.
Denning, Information Warfare and Security, Addison Wesley, 1999, pp. 23-25, and 385-388.
Bace, Intrusion Detection, Macmillan Technical Publishing, 2000, pp. 156, 237-238.
Amoroso, Intrusion Detection: An Introduction to Internet Surveillance, Correlation, Traps, Trace Back, and Response, Intrusion. Net Books, 1999, pp. 145-167.
Cohen, "Fast Effective Rule Induction," *Machine Learning: the 12th International Conference*, Lake Tahoe, CA, 1995.
Quinlan, J.R., C4.5: Programs for Machine Learning. San Mateo: Morgan Kaufmann, 1993.
T. Mitchell. Machine Learning. McGraw-Hill, 1997, pp. 171-174.
Domingos, "Metacost: A General Method for Making Classifiers Cost-Sensitive," Proceedings of the 5th ACM SIGKDD Internation Conference on Knowledge Discovery & Data Mining (KDD-99), Aug. 1999.
Mohiuddin, et al., Jun. 2002, "Defending Against a large scale Denial-of-Service Attack" *Proceedings of the 2002 IEEE Workshop on Information Assurance and Security*, pp. 30-37.
Gibson, 2001, "The Strange Tale of Denial of Service—Attacks Against GRC.COM" http://grc.com/dos/grcdos.htm, pp. 1-29.
Houle, Oct. 2001, "Trends in Denial of Service Attack Technology" CERT® Coordination Center. 1.0:1-20.
Taylor, et al., Sep. 2001, "Nate—Network Analysis of Anomalous Traffic Events, a low-cost approach" New Security Paradigms Workshop, pp. 89-96.
Moskowitz, et al., Mar. 2001, "Randomly Roving Agents for Intrusion Detection" Information Technology Division, Naval Research Laboratory, CHACS, pp. 1-16.
Moore, et al., 2001, "Inferring Internet Denial-of-Service Activity" Usenix, pp. 1-14.
Razmov, May 2000, "Denial of Service Attacks and How to Defend Against Them" Computer Science and Engineering Department, University of Washington, pp. 1-7.
Roesch, 1999, "Snort—Lightweight Intrusion Detection for Networks" LISA XIII Systems Conferences, Seattle, WA, pp. 229-238.
Spatscheck, et al., 1999, "Defending Against Denial of Service Attacks in Scout" Proceedings of 3rd USENIX/ACM, pp. 59-72.
Lippmann, et al., 1999, "Results of the DARPA 1998 Offline Intrusion Detection Evaluation" MIT Lincoln Laboratory, pp. 1-29.
Ferguson, et al., 1998, "Network Ingress Filtering: Defeating Denial of Service Attacks which employ IP Source Address Spoofing" Internet Society pp. 1-10.
Perkins, 1996 "Rfc 2002: IP Mobility Support" http://www.faqs.org/rfcs/rfc2002.html, pp. 1-74.
Lane, et al., "An Application of Machine Learning to Anomaly Detection," Feb. 14, 1997.
Dipankar, et al., "An Intelligent Decision Support System for Intrusion Detection and Response," Published by Springer-Verlag, May 21-23, 2001, St. Petersburg, Russia.
Breunig, et al., "LOF: Identifying Density-Based Local Outliers", *Proc. ACM SICMOD 2000 Int. Conf. on Management of Data*, pp. 93-104 (2000).
Cristianini, et al., "An Introduction to Support Vector Machines and Other Kernel-Based Learning Methods", Cambridge University Press, UK, pp. 9-51 (2000).
Leslie, et al., "The Spectrum Kernel: A String Kernel for SVM Protein Classification", *Proceedings of the Pacific Symposium on Biocomputing*, pp. 564-575 (2002).
Cover, et al., "Nearest Neighbor Pattern Classification", *IEEE Transaction on Information Theory*, IT-13(1):21-27 (1967).
Dasgupta, et al., "An Intelligent Decision Support System for Intrusion Detection and response", V.I. Gorodetski et al., (Eds.): MMM-ACNS 2001, LNCS 2052, Springer-Verlag Berling Heidelberg, pp. 1-144 (2001).

(56) References Cited

OTHER PUBLICATIONS

Eskin, et al., "Modeling System Calls for Intrusion Detection with Dynamic Window Sizes", *Proceedings of DARPA Information Survivability Conference and Exposition II (DISCEX II)*, Anaheim, CA (2001).

Fan, et al., Ensemble-Based Adaptive Intrusion Detection, *Proceedings of 2002 SIAM International Conference on Data Mining*, Arlington, VA (2002).

Fix, "Discriminatory Analysis: Nonparametric Discrimination: Consistency Properties", *International Statistical Review/Revue Internationale de Statisque*, 57(3):238-247 (1989 (Exhibit B).

Forrest, et al., "A Sense of Self for Unix Processes", *1996 IEEE Symposium on Security and Privacy, IEEE Computer Society Press*, Los Alamitos, CA, pp. 120-128 (1996).

Ghosh, et al., "A Study in Using Neural Networks for Anomaly and Misuse Detection", *Proceedings of the 8th USENIX Security Symposium*, Washington, D.C., Aug. 23-26, 1999, 12 pages.

Hausler, et al., "Convolution Kernels on Discrete Structures" Technical Report UCSC-CRE-99- 10, University of California at Santa Cruz (1999), 38 pages.

Knorr, et al., "Algorithms for Mining Distance-Based Outliers in Large Datasets", *Proc. 24th Int. Conf. Very Large Data Bases*, VLDB, pp. 392-403, 24-27 (1998).

Knorr, et al., Finding Intensional Knowledge of Distance-Based Outliers:, *The YLDB Journal*, pp. 211-222 (1999).

Lee, et al., "Data Mining Approaches for Intrusion Detection", *Proceedings of the 1998 USENIX Security Symposium*, 15 pages (1998).

McCallum, et al., "Efficient Clustering of High-Dimensional Data Sets with Application to reference Matching", *Knowledge Discovery and Data Mining*, pp. 169-178 (2000).

Paxson, "Bro: A System for Detecting Network Intruders in Real-Time", *Proceedings of the 7th USENIX Security Symposium*, San Antonio, TX (1998).

Platt, "Fast Training of Support Vector Machines using Sequential minimal Optimization", In B. Scholkopf, C,J.0 Burges and A.J. Smola, Editors, Advances in Kernel Methods—support Vector Learning, pp. 185-208, Cambridge, MA (1999) MIT Press.

Provost, et al. "The Case Against Accuracy Estimation for Comparing Induction Algorithms", *Proceedings of the Fifteenth International Conference on Machine Learning* (1998).

Scholkopf, et al., "Estimating the Support of a High-Dimensional Distribution", *Technical Report 99-87, Microsoft Research*, 1999, to appear in Nerual Computation, 2001.

Watkins, et al., "Dynamic Alignment Kernels", *Advances in Large Margin Classifiers*, pp. 39-50, Cambridge, MA 2000, MIT Press.

Ye, "A Markov Chain Model of Temporal Behavior for Anomaly Detection", *Proceedings of the 2000 IEEE Systems, Man, and Cybernetics Information Assurance and Security Workshop* (2000).

Ye, et al., "Probabilistic Techniques for Intrusion Detection Based on Computer Audit Data", *IEEE Transactions on Systems, Man and Cybernetics—Part A: Systems and Humans*, 31(4):266274 (2001).

METHODS OF UNSUPERVISED ANOMALY DETECTION USING A GEOMETRIC FRAMEWORK

CLAIM FOR PRIORITY TO RELATED APPLICATIONS

This application is a continuation of U.S. patent application Ser. No. 12/022,425, filed Jan. 30, 2008, which claims the benefit of U.S. patent application Ser. No. 10/320,259, filed Dec. 16, 2002, which claims the benefit of U.S. Provisional Patent Application Ser. No. 60/340,196, filed on Dec. 14, 2001, entitled "Unsupervised Anomaly Detection for Computer System Intrusion Detection and Forensics," and U.S. Provisional Patent Application Ser. No. 60/352,894, filed on Jan. 29, 2002, entitled "Geometric Framework for Unsupervised Anomaly Detection in Computer Systems: Detecting Intrusions in Unlabeled Data," all of which are hereby incorporated by reference in their entirety herein.

STATEMENT OF GOVERNMENT RIGHT

The present invention was made in part with support from United States Defense Advanced Research Projects Agency (DARPA), grant nos. FAS-526617, SRTSC-CU019-7950-1, and F30602-00-1-0603. Accordingly, the United States Government may have certain rights to this invention.

COMPUTER PROGRAM LISTING

A computer program listing is submitted in duplicate on CD. Each CD contains routines which are listed in the Appendix, which CD was created on Dec. 12, 2002, and which is 14.6 MB in size. The files on this CD are incorporated by reference in their entirety herein.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

This invention relates to systems and methods detecting anomalies in the operation of a computer system, and more particularly to a method of unsupervised anomaly detection.

2. Background

Intrusion detection systems (IDSs) are an integral part of any complete security package of a modern, well managed network system. The most widely deployed and commercially available methods for intrusion detection employ signature-based detection. These methods extract features from various audit streams, and detect intrusions by comparing the feature values to a set of attack signatures provided by human experts. Such methods can only detect previously known intrusions since these intrusions have a corresponding signature. The signature database has to be manually revised for each new type of attack that is discovered and until this revision, systems are vulnerable to these attacks.

Due to the limitations of signature-based detection, development has proceeded on two major approaches, or paradigms, for training data mining-based intrusion detection systems: misuse detection and anomaly detection. In misuse detection approaches, each instance in a set of data is labeled as normal or intrusion and a machine-learning algorithm is trained over the labeled data. For example, the MADAM/ID system, as described in W. Lee, S. J. Stolfo, and K. Mok, "Data Mining in Work Flow Environments: Experiences in Intrusion Detection," *Proceedings of the* 1999 *Conference on Knowledge Discovery and Data Mining* (KDD-99), 1999, extracts features from network connections and builds detection models over connection records that represent a summary of the traffic from a given network connection. The detection models are generalized rules that classify the data with the values of the extracted features. These approaches have the advantage of being able to automatically retrain intrusion detection models on different input data that include new types of attacks.

Traditional anomaly detection approaches build models of normal data and detect deviations from the normal model in observed data. Anomaly detection applied to intrusion detection and computer security has been an active area of research since it was originally proposed by Denning (see, e.g., D. E. Denning. "An Intrusion Detection Model," *IEEE Transactions on Software Engineering*, SE-13:222-232, 1987). Anomaly detection algorithms have the advantage that they can detect new types of intrusions, because these new intrusions, by assumption, will deviate from normal usage (see. e.g., D. E. Denning, "An Intrusion Detection Model, cited above, and H. S. Javitz and A. Valdes, "The NIDES Statistical Component: Description and Justification," *Technical Report, Computer Science Laboratory, SRI International,* 1993). In this problem, given a set of normal data to train from, and given a new piece of data, the goal of the algorithm is to determine whether or not that piece of data is "normal" or is an "anomaly." The notion of "normal" depends on the specific application, but without loss of generality, normal means stemming from the same distribution. An assumption is made that the normal and anomalous data are created using two different probability distributions and are quantitatively different because of the differences between their distributions. This problem is referred to as supervised anomaly detection.

Some supervised anomaly detection systems may be considered to perform "generative modeling." These approaches build some kind of a model over the normal data and then check to see how well new data fits into that model. A survey of these techniques is given in, e.g., Christina Warrender, Stephanie Forrest, and Barak Pearlmutter, "Detecting Intrusions Using System Calls: Alternative Data Models," 1999 *IEEE Symposium on Security and Privacy*, pages 133-145. IEEE Computer Society, 1999. One approach uses a prediction model obtained by training decision trees over normal data (see., e.g., W. Lee and S. J. Stolfo, "Data Mining Approaches For Intrusion Detection," *Proceedings of the* 1998 *USENIX Security Symposium,* 1998), while another one uses neural networks to obtain the model (see, e.g., A. Ghosh and A. Schwartzbard, "A Study in Using Neural Networks For Anomaly and Misuse Detection," *Proceedings of the* 8*th USENIX Security Symposium,* 1999). Ensemble-based approaches are presented in, e.g., W. Fan and S. Stolfo, "Ensemble-Based Adaptive Intrusion Detection," *Proceedings of* 2002 *SIAM International Conference on Data Mining,* Arlington, Va., 2002. Recent works such as, e.g., Nong Ye, "A Markov Chain Model of Temporal Behavior for Anomaly Detection," *Proceedings of the* 2000 *IEEE Systems, Man, and Cybernetics Information Assurance and Security Workshop,* 2000, and Eleazar Eskin, Wenke Lee, and Salvatore J. Stolfo, "Modeling System Calls For Intrusion Detection With Dynamic Window Sizes," *Proceedings of DARPA Information Survivability Conference and Exposition II (DISCEX II)*, Anaheim, Calif., 2001, estimate parameters of a probabilistic model over the normal data and compute how well new data fits into the model.

A limitation of supervised anomaly detection algorithms is that they require a set of purely normal data from which they train their model. If the data contains some intrusions buried within the training data, the algorithm may not detect future instances of these attacks because it will assume that they are normal. However, in practice, labeled or purely normal data may not be readily available. Consequently, the use of the traditional data mining-based approaches may be impractical. Generally, this approach may require large volumes of audit data, and thus it may be prohibitively expensive to classify data manually. It is possible to obtain labeled data by simulating intrusions, but the detection system trained under such simulations may be limited to the set of known attacks that were simulated and new types of attacks occurring in the future would not be reflected in the training data. Even with manual classification, this approach is still limited to identifying only the known (at classification time) types of attacks, thus restricting detection to identifying only those types. In addition, if raw data were collected from a network environment, it is difficult to guarantee that there are no attacks during the time in which the data is collected.

Due to the limitations of traditional anomaly detection, there has been development of a third paradigm of intrusion detection algorithms, unsupervised anomaly detection (also known as "anomaly detection over noisy data") as described in greater detail in E. Eskin, "Anomaly Detection Over Noisy Data Using Learned Probability Distributions," *Proceedings of the International Conference on Machine Learning*, 2000, to address these problems. These algorithms take as input a set of unlabeled data and attempt to find intrusions buried within the data. In the unsupervised anomaly detection problem, the algorithm uses a set of data where it is unknown which are the normal elements and which are the anomalous elements. The goal is to recover the anomalous elements. After these anomalies or intrusions are detected and/or removed, a misuse detection algorithm or a traditional anomaly detection algorithm may be trained over the data. The goal is to recover the anomalous elements. The model that is computed and that identifies anomalies may be used to detect anomalies in new data, e.g., for online detection of anomalies in network traffic. Alternatively, after these anomalies or intrusions are detected and/or removed, a misuse detection algorithm or a traditional anomaly detection algorithm may be trained over the cleaned data.

In practice, unsupervised anomaly detection has many advantages over supervised anomaly detection. One advantage is that it does not require a purely normal training set. Unsupervised anomaly detection algorithms can be performed over unlabeled data, which is typically easier to obtain since it is simply raw audit data collected from a system. In addition, unsupervised anomaly detection algorithms can be used to analyze historical data to use for forensic analysis. Furthermore, an auditable system can generate data for use in a variety of detection tasks, including network packet data, operating system data, file system data, registry data, program instruction data, middleware application trace data, network management data such as management information base data, email traffic data, and so forth.

A previous approach to unsupervised anomaly detection involves building probabilistic models from the training data and then using them to determine whether a given network data instance is an anomaly or not, as discussed in greater detail in E. Eskin, "Anomaly Detection Over Noisy Data Using Learned Probability Distributions" (cited above). In this algorithm, a mixture model for explaining the presence of anomalies is presented, and machine-learning techniques are used to estimate the probability distributions of the mixture to detect the anomalies.

Another approach to intrusion detection uses distance-based outliers, and is discussed in greater detail in Edwin M. Knorr and Raymond T. Ng, "Algorithms For Mining Distance-Based Outliers in Large Datasets," *Proc. 24th Int. Conf Very Large Data Bases, VLDB*, pages 392-403, 24-27, 1998; Edwin M. Knorr and Raymond T. Ng, "Finding Intentional Knowledge of Distance-Based Outliers," *The YLDB Journal*, pages 211-222, 1999; and Markus M. Breunig, Hans-Peter Kriegel, Raymond T. Ng, and Jorg Sander, "LOF: Identifying Density-Based Local Outliers," *ACM SICMOD Int. Conf on Management of Data*, pages 93-104, 2000. These approaches examine inter-point distances between instances in the data to determine which points are outliers. However, this approach was not used in the field of intrusion detection, and therefore the analysis described in these references was not applied to detect anomalies.

A limitation of these approaches is derived from the nature of the outlier data. Often in network data, the same intrusion occurs multiple times. Consequently, there may be many similar instances in the data. Accordingly, a system which looks at the distances between data points may fail to detect several repeated intrusions as anomalies due to the relatively short distances between the data representing the multiple intrusions.

Accordingly, there exists a need in the art for a technique to detect anomalies in the operation of a computer system which can be performed over unlabeled data, and which can accurately detect many types of intrusions.

SUMMARY OF THE INVENTION

An object of the present invention is to provide a technique for detecting anomalies in the operation of a computer system by analyzing unlabeled data regardless of whether such data contains anomalies.

Another object of the present invention is to provide a technique for detecting anomalies in the operation of a computer system which implicitly maps audit data in a feature space, and which identifies anomalies based on the distribution of data in the feature space.

A further object of the present invention is to provide a technique for detecting anomalies which operates in an efficient manner for a large volume of data.

These and other objects of the invention, which will become apparent with reference to the disclosure herein, are accomplished by a system and methods for detecting an intrusion in the operation of a computer system comprising receiving a set of data corresponding to a computer operation and having a set or vector of features. Since the method is an unsupervised anomaly detection method, the set of data to be analyzed need not be labeled to indicate an occurrence of an intrusion or an anomaly. The method implicitly maps the set of data instances to a feature space, and determines a sparse region in the feature space. A data instance is designated as an anomaly if it lies in the sparse region of the feature space.

According to an exemplary embodiment of the present invention, the step of receiving a set of data instances having a set of features may comprise collecting the set of data instances from an audit stream. For example, the method may comprise collecting a set of system call trace data and/or a set of process traces. According to another embodiment, the method may comprise collecting a set of network connections records data, which may comprise collecting a sequence of TCP packets. The features of the TCP packets may comprise, e.g., the duration of the network connection, the protocol type, the number of bytes transferred by the connection, and an indication of the status of the connection, features describing the data contents of the packets, etc. The algorithms may be used on network management applications sniffing Management Information Bases, or the like, middleware systems, and for general applications that have audit sources, including large scaled distributed applications.

The step of implicitly mapping the set of data instances may comprise normalizing the set of data instances based on the values of the data. For example, the set of feature values of the data instances may be normalized to a number of standard deviations of the values of the feature values of the data instances from the mean or average of the feature values of the set of data instances. The step of implicitly mapping the set of data may comprise applying a convolution kernel to the set of data. An exemplary convolution kernel may comprise a spectrum kernel, etc.

The step of determining a sparse region in the feature space may include clustering the set of data instances. The clustering step may further comprise determining a distance, in the feature space, between a selected data instance and a plurality of clusters, and determining a shortest distance between the selected data instance and a selected cluster in the set of clusters. The clustering step may further comprise determining a cluster width. If the shortest distance between the selected data instance and the selected cluster is less than or equal to the cluster width, the selected data instance is associated with the selected cluster. If the shortest distance between the selected data instance and the selected cluster is greater than the cluster width, the selected data instance is associated with a new cluster formed by the selected data instance. A further step may include determining a percentage of clusters having the greatest number of data instances respectively associated therewith. The percentage of clusters having the greatest number of data instances may be labeled as "dense" regions in the feature space and the remaining clusters may be labeled as "sparse" regions in the feature space. The step of determining a sparse region in the feature space may comprise associating each data instance in the set of data with a respective cluster, e.g., data instances associated with clusters considered "sparse" regions may be considered "anomalous."

In another embodiment, the step of determining a sparse region in the feature space may comprise determining the sum of the distances between a selected data instance and the k nearest data instances to the selected data instance, in which k is a predetermined value. The nearest cluster may be determined as the cluster corresponding to the shortest distance between its respective center and the selected data instance. The determination of the nearest cluster may comprise determining the distances from the selected data instance to the centers of each of the clusters of data, and determining a minimum distance therebetween.

For each data instance in the nearest cluster, the distance between the selected data instance and each data instance in the nearest cluster is determined. If the distance between a point in the nearest cluster is less than the minimum distance determined above, the point in the nearest cluster is labeled as one of the k nearest neighbors. Designating a data instance as an anomaly if it lies in the sparse region of the feature space may comprise determining whether sum of the distances to the k nearest neighbors of the selected data instance exceeds a predetermined threshold.

According to another embodiment, the step of determining a sparse region in the feature space may comprise determining a decision function to separate the set of data instances from an origin. The step of designating a data instance as an anomaly is performed based on the decision function.

In accordance with the invention, the objects as described above have been met, and the need in the art for a technique to detect anomalies in the operation of a computer system over unlabeled data, has been satisfied.

BRIEF DESCRIPTION OF THE DRAWINGS

Further objects, features and advantages of the invention will become apparent from the following detailed description taken in conjunction with the accompanying figures showing illustrative embodiments of the invention, in which.

Figure 1:
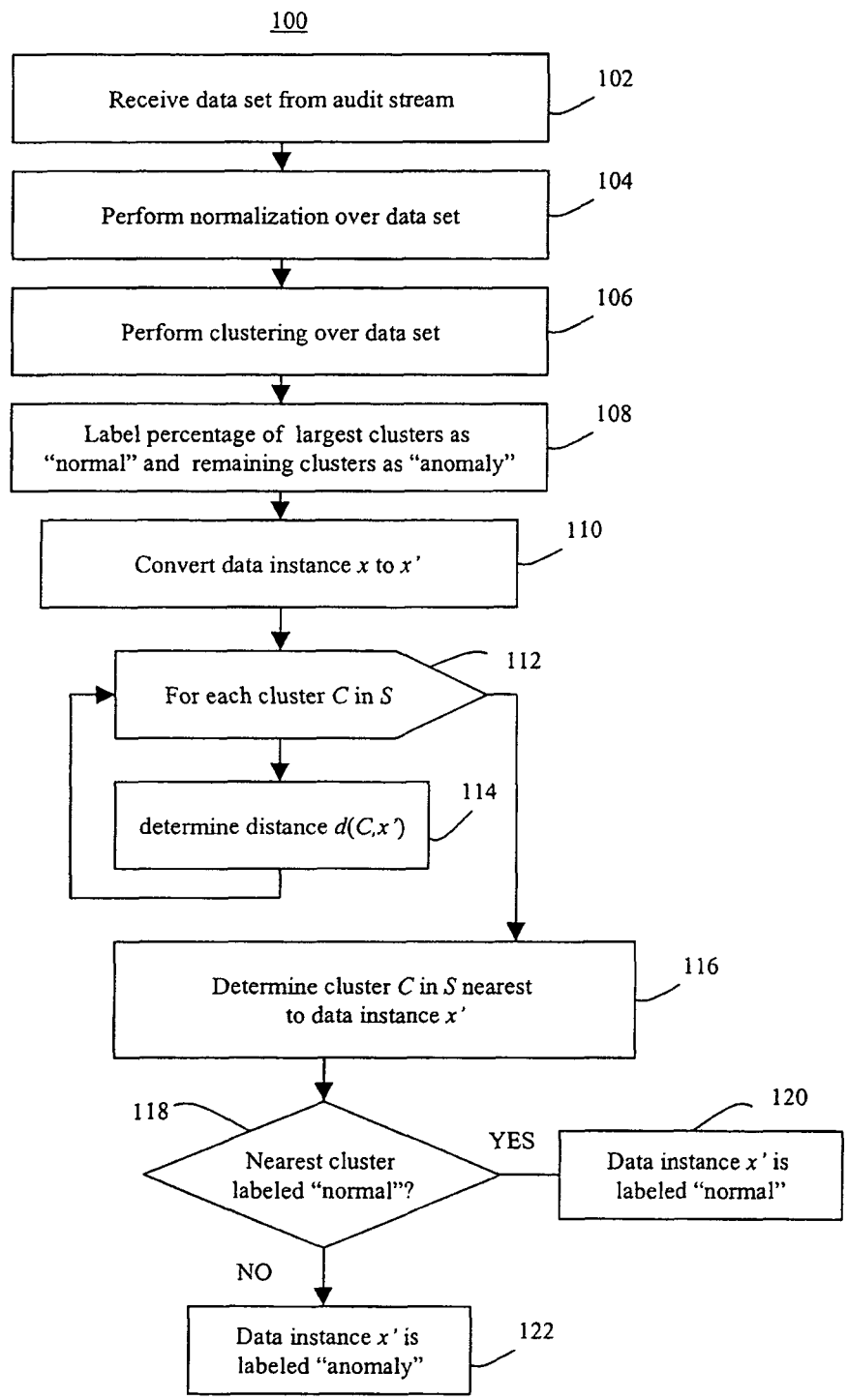
FIG. 1 is a flow chart illustrating a first embodiment of the method in accordance with the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF EXEMPLARY EMBODIMENTS

According to the invention, a geometric framework for unsupervised anomaly detection is described herein. This framework maps the data, denoted D, to a feature space which are points in $\Re^d$, the d-dimensional space of real numbers. Points that are in sparse regions of the feature space are labeled as anomalies. The particular method to determine which points are in a sparse region of the feature space is dependent on the specific algorithm within the framework that is being used, as described in greater detail herein. However, in general, the algorithms will detect anomalies because they will tend to be distant from other points.

A major advantage of the framework described herein is its flexibility and generality. The mappings of data to points in a feature space may be defined to feature spaces that better capture intrusions as outliers in the feature space. The mappings may be defined over any type of audit data such as network connection records, system call traces, Management Information Bases, Window registry data, or any audit sources for middleware systems, and for audit data of general applications that have audit sources, including large scaled distributed applications. Once the mapping is performed to the feature space, the same algorithm can be applied to these different kinds of data. For network data, a data-dependent normalization feature map specifically designed for outlier detection is described. For system call traces, a spectrum kernel feature map is applied. Using these feature maps, it is possible to process both network data which is a vector of features and system call traces which are sequences of system calls using the same algorithms.

Three embodiments of the exemplary method for detecting outliers in the feature space are described herein. All of the algorithms are efficient and can deal with high dimensional data, which is a particular requirement for the application of intrusion detection. The first embodiment is a cluster-based algorithm. The second embodiment is a k-nearest neighbor-based algorithm. The third embodiment is a Support Vector Machine-based algorithm.

The three unsupervised anomaly detection algorithms were evaluated over two types of data sets, a set of network connections and sets of system call traces. The network data that was examined was from the KDD CUP 99 data (as described in greater detail in The Third International Knowledge Discovery and Data Mining Tools Competition Dataset "KDD99-Cup" as published on-line http://kdd.ics.uci.edu/databases/kddcup99/kddcup99.html, 1999, which is incorporated by reference in its entirety herein), an intrusion attack data set which is well known in the art. The system call data set was obtained from the 1999 Lincoln Labs DARPA Intrusion Detection Evaluation (as described in greater detail in R. P. Lippmann, R. K. Cunningham, D. J. Fried, I. Graf, K. R. Kendall, S. W. Webster, and M. Zissman, Results of the 1999 DARPA Off-Line Intrusion Detection Evaluation, *Second International Workshop on Recent Advances in Intrusion Detection* (*RAID* 1999), West Lafayette, Ind., 1999, which is incorporated by reference in its entirety herein), which is also well known in the art.

The novel unsupervised anomaly detection algorithms described herein make two assumptions about the data which motivate the general approach. The first assumption is that the number of normal instances vastly outnumbers the number of anomalies. The second assumption is that the anomalies themselves are qualitatively different from the normal instances. The basic concept is that since the anomalies are both different from normal data and are rare, they will appear as outliers in the data which can be detected. (Consequently, an intrusion that an unsupervised algorithm may have a difficulty detecting is a syn-flood DoS attack. Often under such an attack the number of instances of the intrusion may be comparable to the number of normal instances, i.e., they may not be rare. The algorithms described herein may not label these instances as an attack because the region of the feature space where they occur may be as dense as the normal regions of the feature space.)

The unsupervised anomaly detection algorithms described herein are effective, for example, in situations in which the assumptions hold over the relevant data. For example, these algorithms may not be able to detect the malicious intent of someone who is authorized to use the network and who uses it in a seemingly legitimate way. Detection may be difficult because this intrusion is not qualitatively different from normal instances of the user. In the framework described herein, these instances would be mapped very close to each other in the feature space and the intrusion would be undetectable. However, in both of these cases, more data may be associated or linked with the data, and mapping this newly enriched data to another feature space may render these as detectable anomalies. For example, features may be added describing the history of visits by the IP addresses used in the syn flood attack, and in the latter case, features may be added describing the usage history of the user, i.e. they may use the system legitimately but at odd hours of the day when attacking the system.

One feature of the methods described herein is mapping the records from the audit stream to a feature space. The feature space is a vector space typically of high dimension. Inside this feature space, an assumption is made that some probability distribution generated the data. It is desirable to label the elements that are in low density regions of the probability distribution as anomalies. However, the probability distribution is typically not known. Instead, points that are in sparse regions of the feature space are labeled as anomalies. For each point, the point's location within the feature space is examined and it is determined whether or not the point lies in a sparse region of the feature space. Exactly how this determination is made depends on the algorithm being used, as described herein.

The choice of algorithm to determine which points lie in sparse regions and the choice of the feature map is application dependent. However, critical to the practical use of these algorithms for intrusion detection is the efficiency of the algorithms. This is because the data sets in intrusion detection are typically very large.

The data is collected from an audit stream of the system as is known in the art. For example, one such concrete example of an audit stream may be network packet header data (without the data payload of the network packets) that are "sniffed" at an audit point in the network. In one case of auditing a network operations center for 72 hours using "tcpdump", a common network audit utility function, generated 23 gigabytes of data. Without loss of generality, this audit data is partitioned into a set of data elements $D=\{x_1, x_2, \ldots\}$. The space of all possible data elements is defined as the input (instance) space X Hence, $D \subseteq X$. The parameters of the input space depend on the type of data that is being analyzed. The input space can be the space of all possible network connection records, event logs, system call traces, etc.

The elements of the input space are mapped to points in a feature space Y. In the methods in accordance with the present invention, a feature space is typically a real vector space of some high dimension d, $\Re^d$, or more generally, a Hilbert space, as is known in the art.

A feature map is defined as a function that takes as input an element in the input space and maps it to a point in the feature space. In general, a feature map is defined as $\phi$ to provide the following relationship:

$$\phi: X \to Y \qquad (1)$$

The term image of a data element x is used to denote the point in the feature space $\phi(x)$.

Since the feature space is a Hilbert space, for any points $y_1$ and $y_2$ their dot product $\langle y_1, y_2 \rangle$ is defined. The notation $\langle x, y \rangle$ denotes the dot product of two (feature) vectors. The dot product is the sum of the products of the corresponding vector components of x and y. When there is a space and an algebra where a dot product is defined, it is mathematically possible to define a "norm" on the space, as well as a distance between elements in the space. The norm of a point y in the feature space $\|y\|$ is the square root of the dot product of the point with itself, $\|y\| = \sqrt{\langle y, y \rangle}$. Using this and the fact that a dot product is a symmetric bilinear form, the distance between two elements of the feature space $y_1$ and $y_2$ is defined as follows:

$$\|y_1 - y_2\| = \sqrt{\langle y_1 - y_2, y_1 - y_2 \rangle}$$
$$= \sqrt{\langle y_1, y_1 \rangle - 2\langle y_1, y_2 \rangle + \langle y_2, y_2 \rangle}.$$

Using the framework in accordance with the present invention, the feature map may be used to define relations between elements of the input space. Given two elements in the input space $x_1$ and $x_2$, the feature map may be used to define a distance between the two elements as the distance between their corresponding images in the feature space. The distance function $d_\phi$ is defined as follows:

$$d_\phi(x_1, x_2) = \|\phi(x_1) - \phi(x_2)\| \quad (2)$$
$$= \sqrt{\langle\phi(x_1), \phi(x_1)\rangle - 2\langle\phi(x_1), \phi(x_2)\rangle + \langle\phi(x_2), \phi(x_2)\rangle}.$$

For notational convenience, the subscript may be dropped from $d_\phi$. If the feature space is $\Re^d$, this distance corresponds to standard Euclidean distance in that space.

In many cases, it is difficult to explicitly map a data instance to a point in its feature space. One reason is that the feature space has a very high dimension which makes it difficult to explicitly store the points in the feature space because of memory considerations. In some cases, the explicit map may be very difficult to determine.

Accordingly, a kernel function is defined to compute these dot products in the feature space. A kernel function is defined over a pair of elements in the feature space and returns the dot product between the images of those elements in the feature space. More formally, the kernel function is defined as follows:

$$K_\phi(x_1,x_2) = \langle\phi(x_1),\phi(x_2)\rangle. \quad (3)$$

The distance measure (2) can be redefined through a kernel function as $$d_\phi(x_1,x_2) = \sqrt{K\phi(x_1,x_1) - 2K\phi(x_1,x_2) + K\phi(x_2,x_2)}. \quad (4)$$

In many cases, the kernel function can be computed efficiently without explicitly mapping the elements from the input space to their images. A function is a kernel function if (a) there exists a feature space which is a Hilbert space and (b) for which the kernel function corresponds to a dot product. There are conditions on whether or not a function is a kernel, which are well-known in the art, for example as described in detail in N. Cristianini and J. Shawe-Taylor. *An Introduction to Support Vector Machines*. Cambridge University Press, Cambridge, UK, 2000.

An example of a kernel that performs the mapping implicitly is the "radial basis kernel." The radial basis kernel is a function of the following form:

$$K_{rb}(x_1, x_2) = e^{-\left\{\frac{\|x_1 - x_2\|^2}{\sigma^2}\right\}} \quad (5)$$

The radial basis kernel corresponds to an infinite dimensional feature space, as is known in the art, and described in greater detail in N. Cristianini and J. Shawe-Taylor. *An Introduction to Support Vector Machines*. Cambridge University Press, Cambridge, UK, 2000.

In addition to the computational advantages of kernels, kernels can be defined to take advantage of knowledge about the application. It is possible to weight various features (components of data elements $x_1$ and $x_2$) higher or lower depending on their relative importance to discriminate data based upon domain knowledge.

Although the examples of kernels that have been described herein have been defined over input spaces which are vector spaces, kernels may be defined over arbitrary input spaces. These kinds of kernels are referred to as convolution kernels as is known in the art, and discussed in greater detail in D. Haussler, "Convolution Kernels on Discrete Structures," Technical Report UCS-CRL-99-10, UC Santa Cruz, 1999; C. Watkins, "Dynamic Alignment Kernels," in A. J. Smola, P. L. Bartlett, B. Schölkopf, and D. Schuurmans, editors, *Advances in Large Margin Classifiers*, pages 39-50, Cambridge, Mass., 2000. MIT Press, which are incorporated by reference in their entirety herein).

In accordance with the invention, kernels may be defined directly over the audit data without needing to first convert the data into a vector in $\Re^d$. In addition, since kernels may be defined on not only numerical features, but also on other types of structures, such as sequences, kernels may be defined to handle many different types of data, such as sequences of system calls and event logs. This allows the methods described herein to handle different kinds of data in a consistent framework using different kernels but using the same algorithms which are defined in terms of kernels.

After mapping the data to points in the feature space, the problem of unsupervised anomaly detection may be formalized. An important feature is to detect points that are distant from most other points or in relatively sparse regions of the feature space.

Three exemplary embodiments of the inventive techniques are described herein for detecting anomalies in the feature space. All of the algorithms may be implemented in terms of dot products of the input elements, which allows the use of kernel functions to perform implicit mappings to the feature space. Each algorithm detects points that lie in sparse regions.

The three exemplary algorithms are summarized herein: The first embodiment 100 is a cluster-based algorithm. For each point, the algorithm approximates the density of points near the given point. The algorithm makes this approximation by counting the number of points that are within a sphere of radius w around the point. Points that are in a dense region of the feature space and contain many points within the sphere are considered normal. Points that are in a sparse region of the feature space and contain few points within the sphere are considered anomalies. An efficient approximation to this algorithm is described herein. First, a fixed-width clustering over the points with a radius of w is performed. Then the clusters are sorted based on the size. The points in the small clusters are labeled anomalous.

The second embodiment 200 detects anomalies based on a determination of the k-nearest neighbors of each point. If the sum of the distances to the k-nearest neighbors is greater than a threshold, the point is considered an anomaly. An efficient algorithm to detect outliers is described herein which uses a fixed-width clustering algorithm to significantly speed up the computation of the k-nearest neighbors.

The third embodiment 300 is a support vector machine-based algorithm that identifies low support regions of a probability distribution by solving a convex optimization problem as is known in the art. (An exemplary convex optimization technique is discussed in B. Schölkopf, J. Platt, J. Shawe-Taylor, A. J. Smola, and R. C. Williamson, "Estimating the Support of a High-Dimensional Distribution," Technical Report 99-87, Microsoft Research, 1999, to appear in *Neural Computation*, 2001, and which is incorporated by reference in its entirety herein). The points in the feature space are further mapped into another feature space using a Gaussian kernel. In this second feature space, a hyperplane is drawn to separate the majority of the points away from the origin, as will be described in greater detail herein. The remaining points represent the outliers or anomalies.

Figure 2:
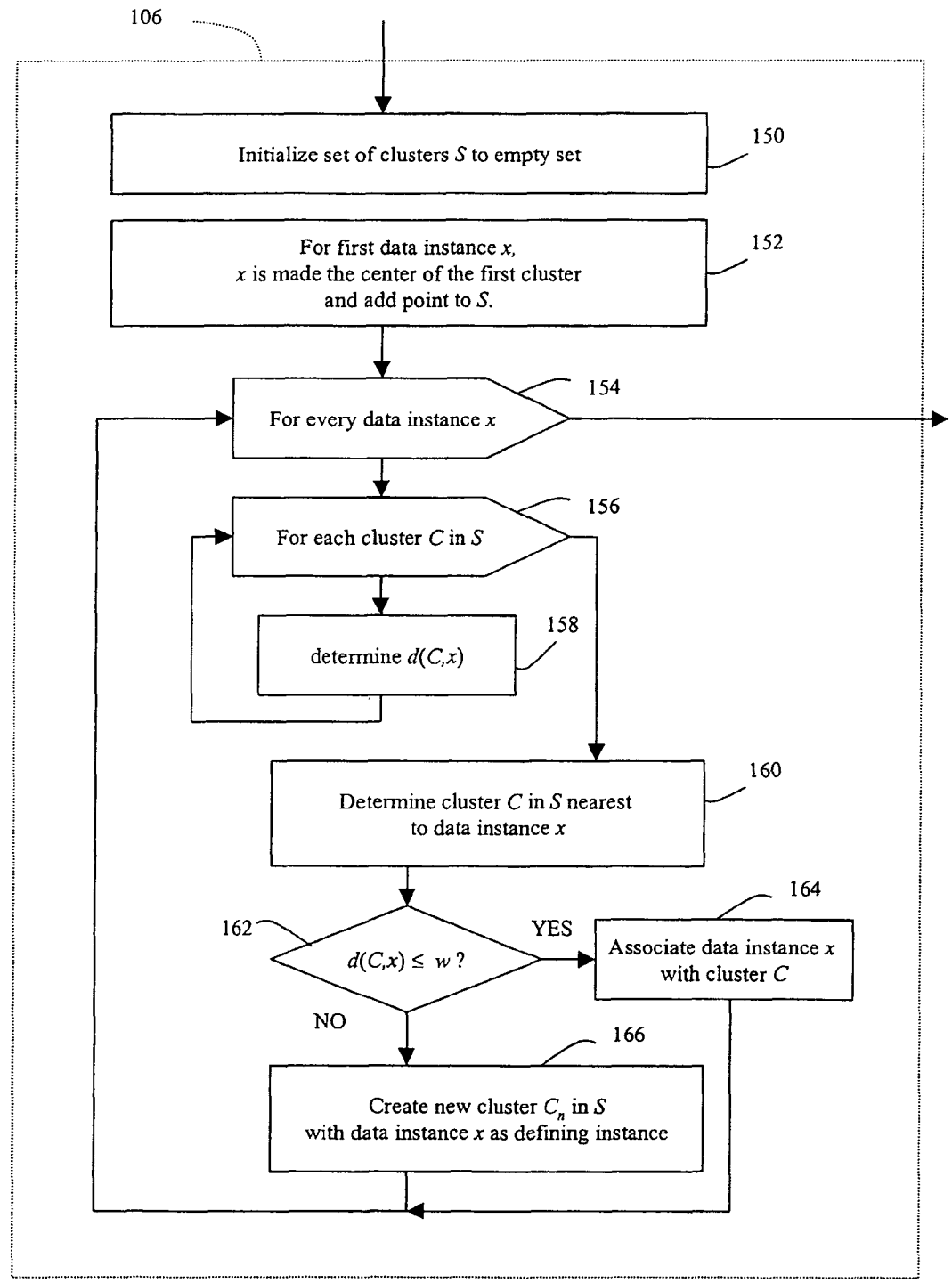
FIG. 2 is a flowchart illustrating a portion of the method of FIG. 1 in accordance with the present invention.

The first algorithm 100 computes the number of points, i.e., instances of data, which are "near" each point in the feature space, and is illustrated in FIGS. 1-2. A first step 102 is receipt of data from the audit stream, which is described in greater detail below.

One parameter in the algorithm is a radius w, also referred to as the "cluster width." For any pair of points $x_1$ and $x_2$, the two points are considered near each other if their distance is less than or equal to w, i.e., $d(x_1, x_2) \le w$ with distance defined as in equation (2), above.

For a point x, the term N(x) is defined as the number of points that are within w of point x. More formally, N(x) is defined as follows:

$$N(x) = \{ s \ d(x, s) \le w \}. \quad (6)$$

The computation of N(x) for all points s has a complexity of $O(n^2)$, in which n is the number of points. This level of complexity results from the fact that it is necessary to compute the pairwise distances between all points.

However, since an objective of the method is the identification of points in sparse regions, the algorithm uses an effective approximation as follows: (1) The fixed-width clustering is performed over the entire data set with cluster width w, and (2) the points in the small clusters are labeled as anomalies. Here the distance of each point is compared to a smaller set of cluster center points, not to all other points, thus reducing the computational complexity.

A fixed-width clustering algorithm is as follows: The first point is made the center of the first cluster. For every subsequent point, if it is within w of a cluster center, it is added to that cluster. Otherwise, a new cluster is created with this point as the center of the new cluster. (Note that some points may be added to multiple clusters, which is modified for embodiment 200, described below.) The fixed-width clustering algorithm requires only one pass through the data. The complexity of the algorithm is O(cn) where c is the number of clusters and n is the number of data points. For a reasonable w, c will be significantly smaller than n.

Note that by the definition in equation (6), for each cluster, the number of points near the cluster center, N(c), is the number of points in the cluster c. For each point x, not a center of a cluster, N(x) is approximated by N(c) for the cluster c that contains x. For points in very dense regions where there is a lot of overlap between clusters, this will be an inaccurate estimate. However, for points that are outliers, there will be relatively few overlapping clusters in these regions and N(c) will be an accurate approximation of N(x). Since the primary interest of the algorithm is the points that are outliers, the points in the dense regions will be higher than the threshold anyway. Thus the approximation is reasonable for the purposes of the algorithm.

With the efficient approximation algorithm, it is possible to process significantly larger data sets than possible with the straightforward algorithm because it is unnecessary to perform a pairwise comparison of points.

Further details of the cluster-based estimation algorithm 100 are given herein. A next stage is the implicit mapping of the input data to the feature space. In algorithm 100, the next stage 104 may be to perform normalization of the input data. Since the algorithm is designed to be general, it must be able to create clusters given a dataset from an arbitrary distribution. A problem with typical data is that different features are on different scales. This causes bias toward some features over other features. As an example, consider two 3-feature vectors, each set coming from different distributions: {(1, 3000, 2), (1, 4000, 3)}. Under a Euclidean metric, the squared distance between feature vectors will be $(1-1)^2 + (3000-4000)^2 + (2-3)^2$ which is dominated by the second column. To solve this problem, the data instances are converted to a standard form based on the training dataset's distribution. That is, an assumption is made that the training dataset accurately reflects the range and deviation of feature values of the entire distribution. Then, all data instances may be normalized to a fixed range, and hard coding of the cluster width may be performed based on this fixed range.

Given a training dataset, the average and standard deviation feature vectors are calculated:

$$\text{avg\_vector}[j] = \frac{1}{n} \sum_{i=1}^{n} \text{instance}_i[j]$$

$$\text{std\_vector}[j] = \left( \frac{1}{n-1} \sum_{i=1}^{n} (\text{instance}_i[j] - \text{avg\_vector}[j])^2 \right)^{1/2}$$

where vector [j] is the element (feature) of the vector. The term avg_vector refers to the vector of average component values, and the term std_vector refers to the vector whose components are standard deviations from the mean of the corresponding components. The term instance refers to a data item from the training data set. The term new_instance refers to a conversion of these data elements in the training set where their components are replaced by a measure of the number of standard deviations each component is from the mean value previously computed.

Then each instance (feature vector) in the training set is converted as follows:

$$\text{new\_instance}[j] = \frac{\text{instance}[j] - \text{avg\_vector}[j]}{\text{std\_vector}[j]}$$

In other words, for every feature value, it is calculated how many standard deviations it is away from the average, and that result becomes the new value for that feature. Only continuous features are converted in this fashion; discrete ones are preserved as they are. In effect, this is a transformation of an instance from its own space to the standardized space, based on statistical information retrieved from the training set.

One of the main assumptions made was that data instances having the same label will tend to be closer together than instances with different labels under some metric. In the exemplary embodiment, a standard Euclidean metric with equally weighted features is used.

Some features took on discrete values, and the metric that was used added a constant value to the squared distance between two instances for every discrete feature where they had two distinct values. This is equivalent to treating each different value as being orthologous in the feature space.

A subsequent step 106 in the exemplary method is to create clusters (see also FIG. 2). To create the clusters from the input data instances, "single-linkage clustering" is used. The approach has an advantage of working in near linear time. The algorithm may begin with an empty set of clusters, and subsequently generates the clusters with a single pass through the dataset. For each new data instance retrieved from the normalized training set, it computes the distance between a data point and each of the centroids of the clusters that exist at that point in the computation. The cluster with the shortest distance is selected, and if that distance is less than some constant w (cluster width) then the instance is assigned to that cluster. Otherwise, a new cluster is created with the instance as its center. More formally, the algorithm proceeds as follows:

Assume there is a fixed a metric M, and a constant cluster width w. Let d(C, x), where C is a cluster and x is an instance, be the distance under the metric M, between C's defining instance and x. The defining instance of a cluster is the feature vector that defines the center (in feature space) of that cluster. This defining instance is referred to as the centroid. The process is re-stated herein:

At step 150, the set of clusters, S, is initialized to the empty set Subsequently, a data instance (having a feature vector) x is obtained from the training set. If S is empty (i.e., the first data instance), then a cluster is created with x as the defining instance, and this instance is added to S (step 152). Next, create a loop for every data instance x (step 154). A loop (step 156) is created to determine the distance from each data instance x to each cluster C previously created (step 158). A next step is to find the cluster in S that is closest to this instance (step 160). In other words, find a cluster C in S, such that for all $C_1$ in S, $d(C, x) \leq d(C_1, x)$. (Although loops are described above, it is understood that this process of analyzing every data instance may be performed by other programming methods.)

A decision block (step 162) analyzes whether $d(C, x) \leq w$. If so, then x is associated with the cluster C (step 164). Otherwise, x is a distance of more than w away from any cluster in S, and so a new cluster must be created for it: $S \leftarrow S \cup \{C_n\}$ where $C_n$ is a cluster with x as its defining instance (step 166). Loop 154 (steps 156-166) are repeated until no instances are left in the training set.

With continued reference to FIG. 1, a next step 108 is labeling the clusters. Under the above-described metric, instances with the same classification are close together and those with different classifications are far apart. If an appropriate cluster width w has been chosen, then after clustering, a set of clusters may be obtained with instances of a single type in each of them. This corresponds to the second assumption about the data, i.e., that the normal and intrusion instances are qualitatively different.

Since unsupervised anomaly detection deals with unlabeled data, there is no access to labels during training. Therefore, the algorithm uses another approach to determine which clusters contain normal instances and which contain attacks (anomalies). A first assumption about the data is that normal instances constitute an overwhelmingly large portion (>98%) of the training dataset. Under this assumption, it is highly probable that clusters containing normal data will have a much larger number of instances associated with them than would clusters containing anomalies. Consequently some percentage P of the clusters containing the largest number of instances associated with them are labeled as "normal." The rest of the clusters are labeled as "anomalous" and are considered to contain attacks.

A potential problem may arise with this approach, however, depending on how many sub-types of normal instances there are in the training set. For example, there may be many different kinds of normal network activity, such as using different protocols or services, e.g., ftp, telnet, www, etc. Each of these uses might have its own distinct point in feature space where network data instances for that use will tend to cluster around. This, in turn, might produce a large number of such 'normal' clusters, one for each type of normal use of the network. Each of these clusters will then have a relatively small number of instances associated with it, and in certain cases less than some clusters containing attack instances. As a result, it is possible that these normal clusters will be incorrectly labeled as anomalous. To prevent this problem, the percentage of normal instances in the training set must be sufficiently large in relation to the attacks. Then, it is very likely that each type of normal network use will have adequate (and larger) representation than each type or sub-type of attack.

Once the clusters are created from a training set, the system is ready to perform the next step, i.e., detection of intrusions. Given an instance x, classification proceeds as follows:

At step 110, convert x based on the statistical information of the training set from which the clusters were created. (For example, conversion may refer to normalizing x to the mean and the standard deviation.) Let x' be the instance after conversion. A loop (step 112) is performed for each cluster C in S, in order to determine $d(C, x')$ (step 114). At step 116, the cluster which is closest to d' under the metric M is determined (i.e., a cluster C in the cluster set, such that for all C' in S, $d(C, x') \leq d(C', x')$. The choice of the cluster is determined by checking the distance to each cluster and picking the minimum. This includes checking the distance to a number of points which are the centers of the clusters. The number of points is the number of clusters.

Subsequently, x' is classified according to the label of C (either "normal" or "anomalous"). In other words, the algorithm finds the cluster that is closest to x (converted) and give it that cluster's classification. At step 118, it is ascertained whether the nearest cluster is labeled "normal." If so, the data instance x' is also labeled "normal" (step 120). Otherwise, the data instance x' is labeled as an "anomaly" (step 122).

Figure 3:
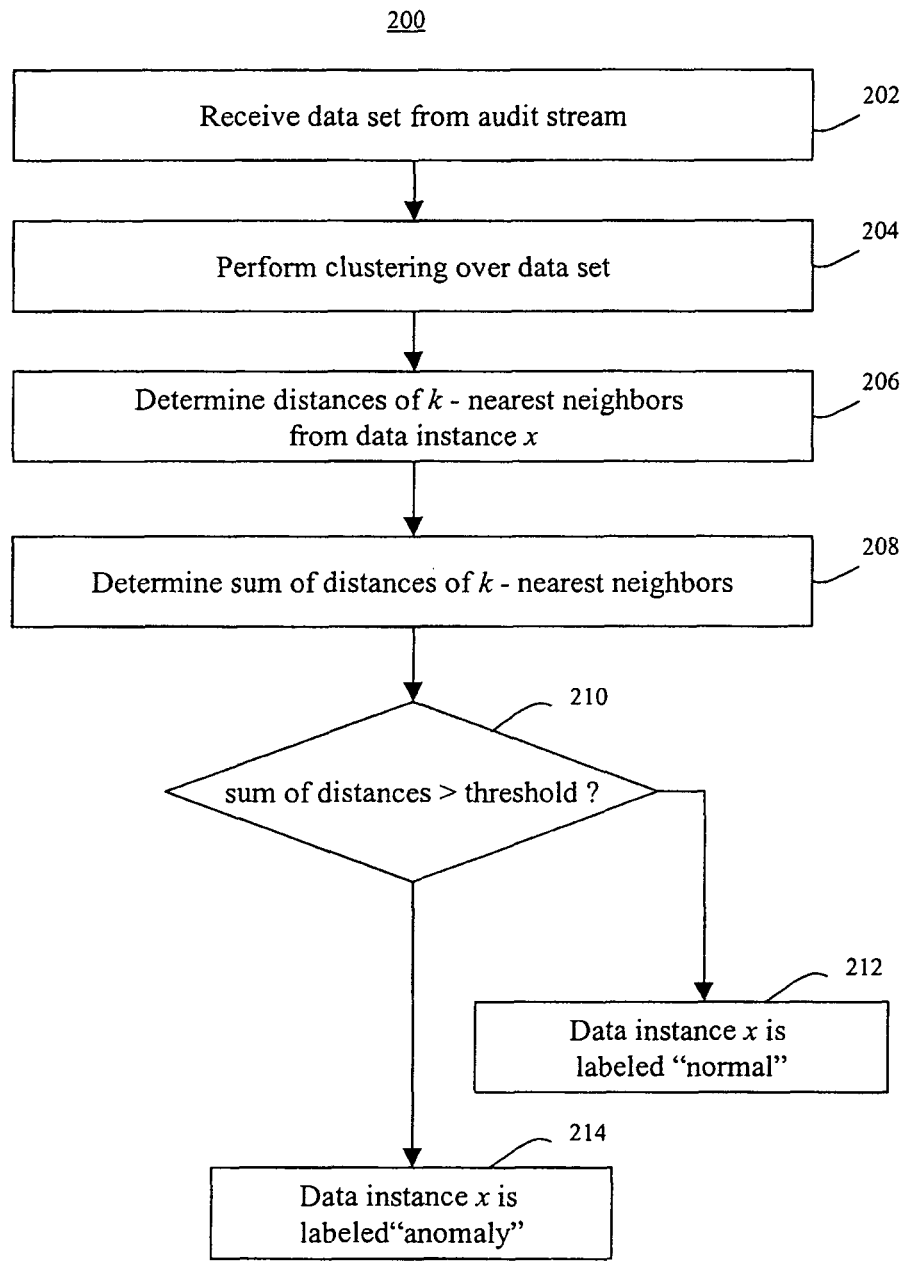
FIG. 3 is a flow chart illustrating a second embodiment of the method in accordance with the present invention.
Figure 4:
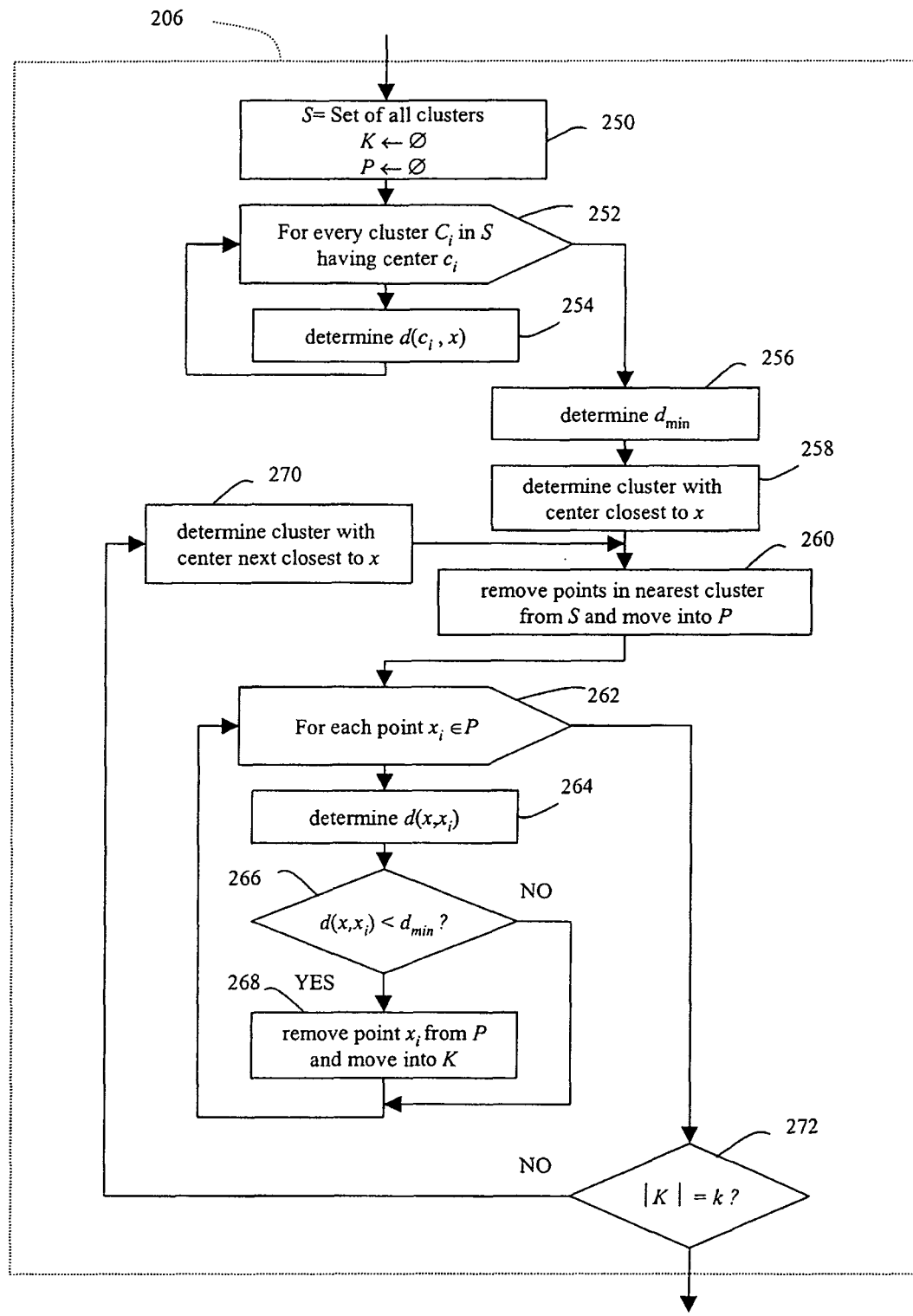
FIG. 4 is a flowchart illustrating a portion of the method of FIG. 3 in accordance with the present invention.

As illustrated in FIGS. 3-4, a second exemplary algorithm 200 of the inventive method determines whether or not a point lies in a sparse region of the feature space by determining the sum of the distances to the k-nearest neighbors of the point. This quantity is referred to as the "k-NN" score for a point.

Intuitively, a point in a dense region will have many points near it, and thus the point will have a small k-NN score, i.e., a small distance to the k-nearest neighbor. If the size of k, i.e., the number of nearest neighbors used in the evaluation, exceeds the frequency of any given attack type in the data set, and the images of the attack elements are far from the images of the normal elements, then the k-NN score is useful for detecting these attacks.

A potential problem with determining the k-NN score is that it is computationally expensive to compute the k-nearest neighbors of each point. The complexity of this computation is $O(n^2)$ which may be impractical for certain intrusion detection applications since n=|D|, i.e., n is the size of the data which may be a very large number of packets.

Since the method of the invention is concerned with the k-nearest points to a given point, the algorithm operates by using a technique similar to "canopy clustering" (as discussed in greater detail in Andrew McCallum, Kamal Nigam, and Lyle H. Ungar, "Efficient Clustering of High-Dimensional Data Sets with Application to Reference Matching," *Knowledge Discovery and Data Mining*, pages 169-178, 2000, which is incorporated by reference in its entirety herein). Canopy clustering is used as a means of partitioning the space into smaller subsets, reducing the need to check every data point. The clusters are used as a tool to reduce the time of finding the k-nearest neighbors.

The method is described herein: First, the data is received from the audit stream (step 202) as described in greater detail below, and clustered using the fixed-width clustering algorithm as described above (step 204). Each element is placed into only one cluster. Step 204 is substantially identical to the step 106, described above with the following differences noted herein: Each element is placed into only one cluster. Once the data is clustered with width w, the k-nearest neighbors can be computed for a given point x by taking advantage of the following properties:

The point which is the center of the cluster that contains a given point x is denoted as C(x). For a cluster center C and a point x, the notation d(C, x) is used to denote the distance between the point and the cluster center. For any two points $x_1$ and $x_2$, if the points are in the same cluster, the following relation holds:

$$d_\phi(x_1, x_2) \leq 2w \tag{7}$$

and in all cases $$d_\phi(x_1, x_2) \leq d_\phi(x_1, c(x_2)) + w \tag{8}$$

$$d_\phi(x_1, x_2) \leq d_\phi(x_1, c(x_2)) - w \tag{9}$$

The algorithm uses these three inequalities to determine the k-nearest neighbors of a point x.

The algorithm proceeds as follows and is illustrated in FIG. 4. Let S be a set of clusters. Initially, S contains all of the clusters in the data. At any step in the algorithm, there may be a set of points which are potentially among the k-nearest neighbor points. This set is denoted as P. There is a set of points that is in fact among the k-nearest neighbor points. This set is denoted K. Initially, K and P are empty (step 250). The distance from data instance x to each cluster in S (step 254) is precomputed in loop 252. The minimum distance between the data instance x and each cluster is determined at step 256 ($d_{min}$ is defined in greater detail below). The cluster having its center closest to x is determined (step 258). For the cluster with center closest to x, its data is removed from S, and all of its points are added to P (step 260). This operation is referred to as "opening" the cluster. By this method, a lower bound of the distance from all points in the clusters in set S can be obtained using equation (9), above. The minimum distance is defined as follows:

$$d_{min} = \min_{C \in S} d(C, x) - w \tag{10}$$

The algorithm performs the following steps: A loop 262 is set up to evaluate each point in $x_i \in P$, to determine the distance $d(x, x_i)$ between data instance x and each data point $x_i$ (step 264). If the computation determines that $d(x, x_i) < d_{min}$, then $x_i$ is considered closer to x than all of the points in the clusters in S (step 266). In other words, point $x_i$ is considered a k-nearest neighbor. In this case, point $x_i$ is removed from P and added to K (step 268). If the computation determines that the distance $d(x, x_i) \geq d_{min}$ for any element of P (including the case that if P is empty), then the next closest cluster is determined (step 270) and "opened" by adding all of its points to P and removing that cluster from S (step 260). The distance from x to each cluster in S is recomputed. When the next closest cluster is removed from S, $d_{min}$ will increase. Once K has k elements (step 272), this stage of the process is completed. The sum of the distances of the k-nearest neighbors is determined at step 208 (see, FIG. 3).

A significant portion of the computation is used to check the distance between points in D to the cluster centers. This is significantly more efficient than computing the pairwise distances between all points.

The choice of width w does not affect the k-NN score, but instead only affects the efficiency of computing the score. Intuitively, cluster width w is chosen to split the data into reasonably sized clusters. As determined at step 210, if the sum of the distances to the k-nearest neighbors is less than or equal to a threshold, the point is considered a "normal" (step 212) and if the sum of the distances to the k-nearest neighbors is greater than a threshold, the point is considered an "anomaly" (step 214).

Figure 5:
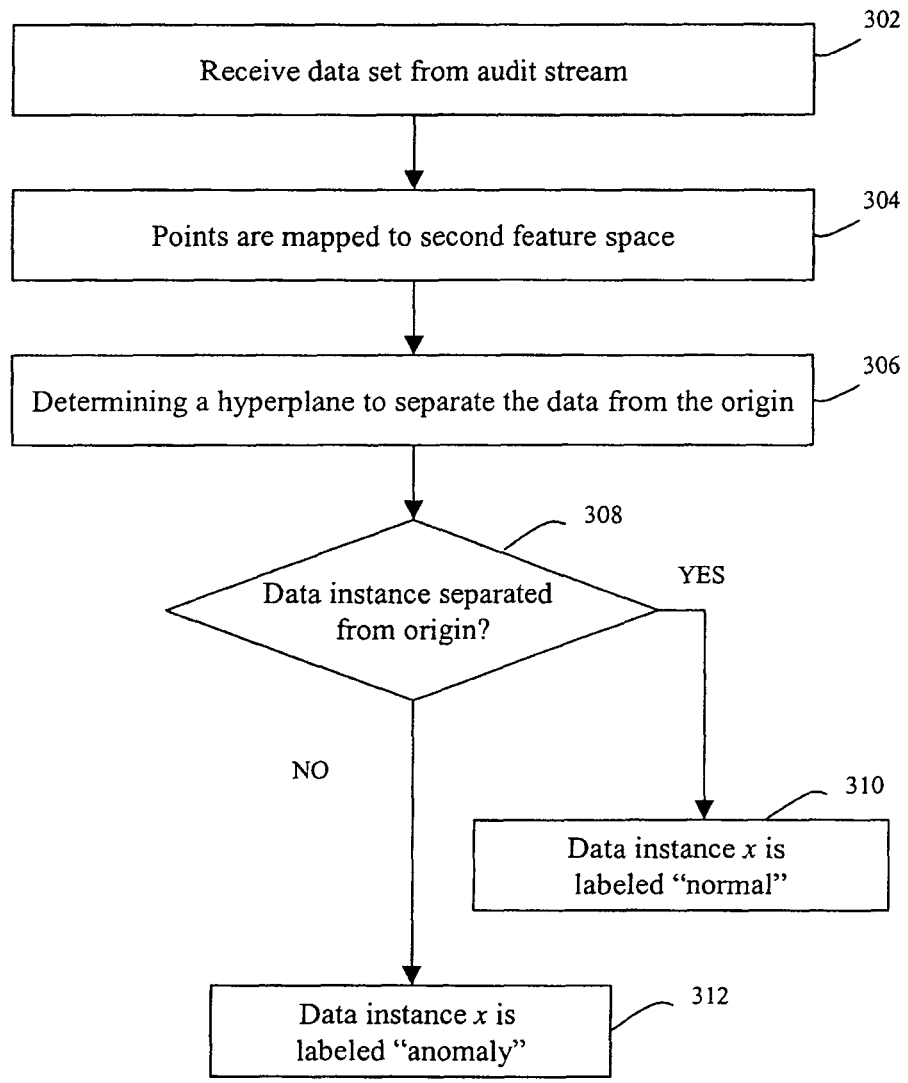
FIG. 5 is a flow chart illustrating a third embodiment of the method in accordance with the present invention.

The third exemplary algorithm 300, illustrated in FIG. 5, uses an algorithm presented in greater detail in B. Schölkopf, J. Platt, J. Shawe-Taylor, A. J. Smola, and R. C. Williamson, "Estimating the Support of a High-Dimensional Distribution," *Technical Report* 99-87, Microsoft Research, 1999, to appear in *Neural Computation,* 2001, which is well known in the art and is incorporated by reference in its entirety herein, to estimate the region of the feature space where most of the data occurs. The algorithm receives data from an audit stream (step 302) as described in greater detail below. At step 304, the feature space is first mapped into a second feature space with a radial basis kernel, equation (5), and then subsequent calculations proceed in the new feature space.

The standard SVM algorithm is a supervised learning algorithm as is known in the art. It requires labeled training data to create its classification rule. In B. Schölkopf, et. al, incorporated by reference above, the SVM algorithm is adapted into an unsupervised learning algorithm. This unsupervised variant does not require its training set to be labeled to determine a decision surface.

Whereas the supervised version of SVM tries to maximally separate two classes of data in feature space by a hyperplane, the unsupervised version instead attempts to separate the entire set of training data from the origin with a hyperplane (step 306). (As is well known in the art, the term origin refers to the point with coordinates (0, 0, 0, . . . 0) in the feature space.) This is performed by solving a quadratic program that penalizes any points not separated from the origin while simultaneously trying to maximize the distance of this hyperplane from the origin. At the end of this optimization, this hyperplane then acts as the decision function, with those points that it separates from the origin classified as "normal" (step 310) and those which are on the other side of the hyperplane, are classified as "anomalous" (step 312).

The algorithm is similar to the standard SVM algorithm in that it uses kernel functions to perform implicit mappings and dot products. It also uses the same kind of hyperplane for the decision surface. The solution is only dependent on the support vectors as well. However, the support vectors are determined in a different way. In particular, this algorithm attempts to find a small region where most of the data lies and label points in that region as "class +1." Points in other regions are labeled as "class −1." The algorithm attempts to find the hyperplane that separates the data points from the origin with maximal margin. The decision surface that is chosen is determined by solving an optimization problem that determines the "best" hyperplane under a set of criteria which are known in the art, and described for example, in N. Cristianini and J. Shawe-Taylor, *An Introduction to Support Vector Machines*, Cambridge University Press, Cambridge, UK, 2000, which is incorporated by reference in its entirety herein.

The specific optimization that is solved for estimating the hyperplane specified by the hyperplane's normal vector in the feature space w and offset from the origin $\rho$ is $$\min \frac{1}{2} \|w\|^2 + \frac{1}{vi} \sum_i^l \zeta_i - \rho \tag{11}$$

$$w \in Y, \zeta_i \in \Re, \rho \in \Re$$

$$\text{subject to: } (w \cdot \phi(x_i)) \geq \rho - \zeta_i, \zeta_i \geq 0 \tag{12}$$

where $0<v<1$ is a parameter that controls the trade-off between maximizing the distance from the origin and containing most of the data in the region created by the hyperplane and corresponds to the ratio of expected anomalies in the data set. $\zeta_i$ are slack variables that penalize the objective function but allow some of the points to be on the other wrong side of the hyperplane.

After the optimization problem is solved, the decision function for each point x is $$f(x)=\text{sgn}((w\cdot\phi(x))-\rho). \quad (13)$$

A Lagrangian is introduced and this optimization is rewritten in terms of the Lagrange multipliers $\alpha_i$ to represent the optimization as $$\text{minimize } \frac{1}{2}\sum_{i,j}\alpha_i\alpha_j K_\phi(x_i, x_j)$$

$$\text{subject to: } 0 \le \alpha_i \le \frac{1}{vl}, \sum_i \alpha_i = 1$$

at the optimum, $\rho$ can be computed from the Lagrange multipliers for any $x_i$ such that the corresponding Lagrange multiplier $\alpha_i$ satisfies $$0 < \alpha_i < \frac{1}{vl}$$

$$\rho = \sum_j \alpha_j K_\phi(x_j, x_i)$$

In terms of the Lagrange multipliers, the decision function is $$f(x) = \text{sgn}\left(\sum_i \alpha_i K_\phi(x_i, x) - \rho\right). \quad (14)$$

One property of the optimization is that for the majority of the data points, $\alpha_i$ will be 0 which makes the decision function efficient to compute.

The optimization is solved with a variant of the Sequential Minimal Optimization algorithm as is known in the art and described in greater detail in J. Platt, "Fast Training of Support Vector Machines Using Sequential Minimal Optimization," In B. Scholkopf, C. J. C. Burges, and A. J. Smola, editors, *Advances in Kernel Methods—Support Vector Learning*, pages 185-208, Cambridge, Mass., 1999, MIT Press, which is incorporated by reference in its entirety herein. Details on the optimization, the theory behind the relation of this algorithm and the estimation of the probability density of the original feature space, and details of the algorithm are known in the art and fully described in B. Schölkopf, et al., "Estimating the Support of a High-Dimensional Distribution, incorporated by reference above.

The choice of feature space for unsupervised anomaly detection is application-specific, and is now described in greater detail. The performance greatly depends on the ability of the feature space to capture information relevant to the application. For optimal performance, it is best to analyze the specific application and choose a feature space accordingly.

In several experiments, two data sets were analyzed. The first data set is a set of network connection records. This data set contains records which contain 41 features describing a network connection. The second data set is a set of system call traces. Each entry is a sequence of all of the system calls that a specific process makes during its execution.

Two different feature maps were used for the different kinds of data that were analyzed. For data which are records, a data-dependent normalization kernel was used to implicitly define the feature map. This feature map takes into account how abnormal a specific feature in a record is when it performs the mapping.

For system call data where each trace is a sequence of system calls, a string kernel is applied over these sequences. The kernel used is called a spectrum kernel which is known in the art and was previously used to analyze biological sequences, as described in greater detail, e.g., in Eleazar Eskin, Christina Leslie and William Stafford Noble, "The Spectrum Kernel: A String Kernel for SVM Protein Classification," *Proceedings of the Pacific Symposium on Biocomputing* (PSB-2002), Kaua'i, Hi., 2002, which is incorporated by reference in its entirety herein. The spectrum kernel maps short sub-sequences of the string into the feature space, which is consistent with the practice of using short sub-sequences as the primary basis for analysis of system call sequences, as described in greater detail in e.g., Stephanie Forrest, S. A. Hofmeyr, A. Somayaji, and T. A. Longstaff, "A Sense of Self for UNIX Processes," 1996 *IEEE Symposium on Security and Privacy*, pages 120-128. IEEE Computer Society, 1996; W. Lee, S. J. Stolfo, and P. K. Chan, "Learning Patterns From UNIX Processes Execution Traces For Intrusion Detection," *AAAI Workshop on AI Approaches to Fraud Detection and Risk Management*, pages 50-56. AAAI Press, 1997; Eleazar Eskin, Wenke Lee, and Salvatore J. Stolfo. "Modeling System Calls for Intrusion Detection with Dynamic Window Sizes," *Proceedings of DARPA Information Survivability Conference and Exposition II (DISCEX II)*, Anaheim, Calif., 2001, and U.S. application Ser. No. 10/208,402 filed Jul. 30, 2002 entitled "SYSTEM AND METHODS FOR INTRUSION DETECTION WITH DYNAMIC WINDOW SIZES," which are incorporated by reference in their entirety herein.

For data which is a network connection record, a data-dependent normalization feature map is used. This feature map takes into account the variability of each feature in the mapping in such a way that normalizes the relative distances between feature values in the feature space.

There are two types of attributes in a connection record. There are either numerical attributes or discrete attributes. Examples of numerical attributes in connection records are the number of bytes in a connection or the number of connection attempts to the same port. An example of discrete attributes in network connection records is the type of protocol used for the connection. Some attributes that appear to be numerical are in fact discrete values, such as the destination port of a connection. Discrete and numerical attributes are handled differently in the kernel mapping.

One potential problem with the straightforward mapping of the numerical attributes is that they may be on different scales. If a certain attribute is a hundred times larger than another attribute, it will dominate the second attribute. All of the attributes are normalized to the number of standard deviations away from the mean. This scales the distances based on the likelihood of the attribute values. This feature map is data dependent because the distance between two points depends on the mean and standard deviation of the attributes which in turn depends on the distribution of attribute values over all of the data.

For discrete values, a similar data dependent concept is used. Let $\Sigma_i$ be the set of possible values for discrete attribute i. For each discrete attribute there are $|\Sigma_i|$ coordinates in the feature space corresponding to this attribute. There is one coordinate for every possible value of the attribute. A specific value of the attribute gets mapped to the feature space as follows. The coordinate corresponding to the attribute value has a positive value $$\frac{1}{|\Sigma_i|}$$

and the remaining coordinates corresponding to the feature have a value of 0. The distance between two vectors is weighted by the size of the range of values of the discrete attributes. A different value for attribute i between two records will contribute $$\frac{2}{|\Sigma_i|^2}$$

to the square of the norm between the two vectors.

Convolution kernels can be defined over arbitrary input spaces. A kernel is defined over sequences to model sequences of system calls is used. The specific kernel used in the exemplary embodiment is a spectrum kernel which has been successfully applied to modeling biological sequences, as described in Eskin et. al, "The Spectrum Kernel: A String Kernel for SVM Protein Classification," above.

The spectrum kernel is defined over an input space of sequences. These sequences can be an arbitrary long sequence of elements from an alphabet $\Sigma$. For any k>0, the feature space of the k-spectrum kernel is defined as follows. The feature space is a $|\Sigma|^k$ dimensional space where each coordinate corresponds to a specific k length sub-sequence. For a given sequence, the value of a specific coordinate of the feature space is the count of the number of times the corresponding sub-sequence occurs in the sequence. These sub-sequences are extracted from the sequence by using a sliding window of length k.

The dimension of the feature space is exponential in k which may make it impractical to store the feature space explicitly. Note that the feature vectors corresponding to a sequence are extremely sparse. Accordingly, the kernels may be efficiently computed between sequences using an efficient data structure as is known in the art and described in Eskin et al., "The Spectrum Kernel: A String Kernel for SVM Protein Classification," cited above. For example, in one of the experiments 26 possible system calls and sub-sequences of length 4 are considered, which gives a dimension of the feature space of close to 500,000.

Experiments were performed over two different types of data. Network connection records and system call traces were analyzed.

To evaluate the system two major indicators of performance were considered: the detection rate and the false positive rate. The detection rate is defined as the number of intrusion instances detected by the system divided by the total number of intrusion instances present in the test set. The false positive rate is defined as the total number of normal instances that were (incorrectly) classified as intrusions divided by the total number of normal instances. These are good indicators of performance, since they measure what percentage of intrusions the system is able to detect and how many incorrect classifications it makes in the process. These values are calculated over the labeled data to measure performance.

The trade-off between the false positive and detection rates is inherently present in many machine-learning methods. By comparing these quantities against each other, it is possible to evaluate the performance invariant of the bias in the distribution of labels in the data. This is especially important in intrusion-detection problems because the normal data outnumbers the intrusion data by a factor of 100:1. The classical accuracy measure is misleading because a system that always classifies all data as normal would have a 99% accuracy.

ROC (Receiver Operating Characteristic) curves, as described in greater detail in Foster Provost, Tom Fawcett, and Ron Kohavi, "The Case Against Accuracy Estimation for Comparing Induction Algorithms, *Proceedings of the Fifteenth International Conference on Machine Learning*, July 1998, depicting the relationship between false positive and detection rates for one fixed training/test set combination. ROC curves are a way of visualizing the trade-offs between detection and false positive rates.

The network connection records used were the KDD Cup 1999 Data described above, which contained a wide variety of intrusions simulated in a military network environment. It consisted of approximately 4,900,000 data instances, each of which is a vector of extracted feature values from a connection record obtained from the raw network data gathered during the simulated intrusions. A connection is a sequence of TCP packets to and from some IP addresses. The TCP packets were assembled into connection records using the Bro program, as described in greater detail in V. Paxson. "Bro: A System for Detecting Network Intruders in Real-Time," *Proceedings of the 7th USENIX Security Symposium*, San Antonio, Tex., 1998, modified for use with MADAM/ID, as described in greater detail in W. Lee, S. J. Stolfo, and K. Mok. "Data Mining in Work Flow Environments: Experiences in Intrusion Detection," *Proceedings of the* 1999 *Conference on Knowledge Discovery and Data Mining* (KDD-99), 1999. Each connection was labeled as either normal or as exactly one specific kind of attack. All labels are assumed to be correct.

The simulated attacks fell in one of the following four categories: DOS—Denial of Service (e.g. a syn flood), R2L—Unauthorized access from a remote machine (e.g. password guessing), U2R—unauthorized access to superuser or root functions (e.g. a buffer overflow attack), and Probing—surveillance and other probing for vulnerabilities (e.g. port scanning). There was a total of 24 attack types.

The extracted features included the basic features of an individual TCP connection such as its duration, protocol type, number of bytes transferred, and the flag indicating the normal or error status of the connection. Other features of an individual connection were obtained using some domain knowledge, and included the number of file-creation operations, number of failed login attempts, whether root shell was obtained, and others. Finally, there were a number of features computed using a two-second time window. These included the number of connections to the same host as the current connection within the past two seconds, percent of connections that have "SYN" and "REJ" errors, and the number of connections to the same service as the current connection within the past two seconds. In total, there are 41 features, with most of them taking on continuous values.

The KDD data set was obtained by simulating a large number of different types of attacks, with normal activity in the background. The goal was to produce a good training set for learning methods that use labeled data. As a result, the proportion of attack instances to normal ones in the KDD training data set is very large as compared to data that may be expected in practice. Unsupervised anomaly detection algorithms are sensitive to the ratio of intrusions in the data set. If the number of intrusions is too high, each intrusion will not show up as anomalous. In order to make the data set more realistic, many of the attacks were filtered so that the resulting data set consisted of 1 to 1.5% attack and 98.5 to 99% normal instances.

The system call data is from the BSM (Basic Security Module) data portion of the 1999 DARPA Intrusion Detection Evaluation data created by MIT Lincoln Labs, as is known in the art, and described in greater detail in R. P. Lippmann, R. K. Cunningham, D. J. Fried, I. Graf, K. R. Kendall, S. W. Webster, and M. Zissman, "Results of the 1999 DARPA Off-Line Intrusion Detection Evaluation," *Second International Workshop on Recent Advances in Intrusion Detection* (*RAID* 1999), West Lafayette, Ind., 1999. The data consists of five weeks of BSM data of all processes run on a Solaris machine. Three weeks of traces of the programs which were attacked during that time were examined. The programs examined were eject and ps.

Each of the attacks that occurred correspond to one or more process traces. An attack can correspond to multiple process traces because a malicious process can spawn other processes. The attack was considered detected if one of the processes that correspond to the attack is detected.

Table 1 summarizes the system call trace data sets and lists the number of system calls and traces for each program.

attacks identified as being malicious without any false positives. One possible explanation for these results, without limiting the foregoing, may be obtained by looking at exactly what the feature space is encoding. Each system call trace is mapped to a feature space using the spectrum kernel that contains a coordinate for each possible sub-sequence. Process traces that contain many of the same sub-sequences of system calls are closer together than process traces that contain fewer sub-sequences of system calls.

For the network connections, the data is not nearly as regular as the system call traces. From the experiments, there were some types of attacks that were able to be detected well and other types of attacks that were not able to be detected. One possible explanation, without limiting the foregoing, is that some of the attacks using the feature space were in the same region as normal data. Although the detection rates are lower than what is typically obtained for either misuse or supervised anomaly detection, the problem of unsupervised anomaly detection is significantly harder because there is no access to the labels or a guaranteed clean training set.

Figure 6:
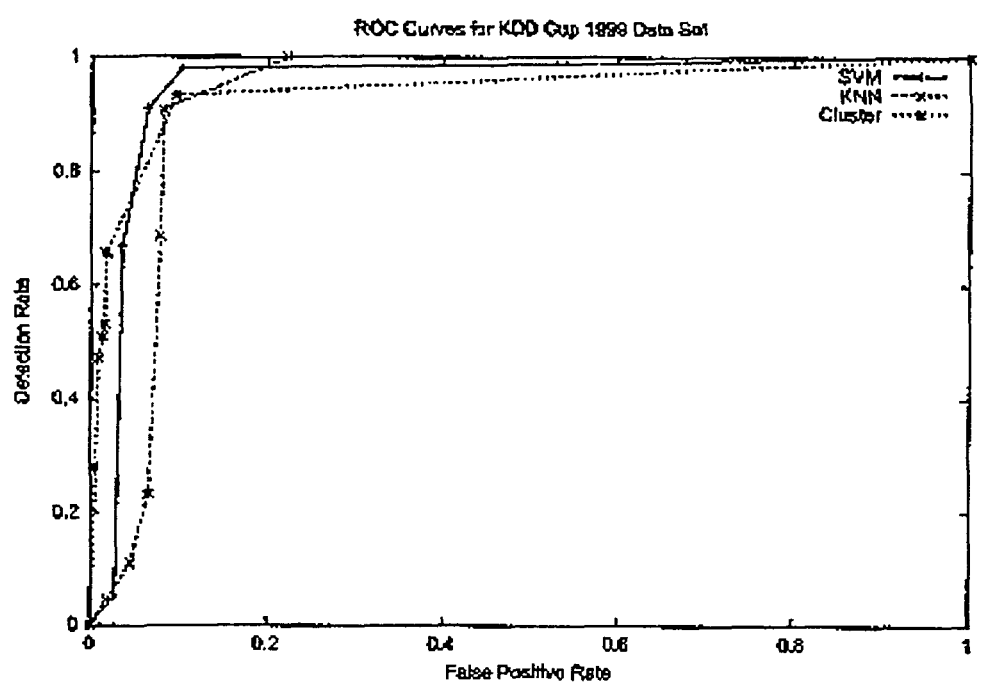
FIG. 6 is a plot illustrating the results of the three embodiments of the method in accordance with the present invention.

FIG. 6 shows the performance of the three algorithms over the KDD Cup 1999 data. Table 2 shows the Detection Rate and False Positive Rate for some selected points from the ROC curves for the embodiments 100 (clustering), 200

TABLE 1

| Program Name | Total # of Attacks | # Intrusion Traces | # Intrusion System Calls | # Normal Traces | # Normal System Calls | % Intrusion Traces |
|---|---|---|---|---|---|---|
| PS | 3 | 21 | 996 | 208 | 35092 | 2.7% |
| eject | 3 | 6 | 726 | 7 | 1278 | 36.3% |

For each of the data sets, the data was divided into two portions. One portion, the training set, was used to set parameters values for our algorithms and the second, the test set, was used for evaluation. Parameters were set based on the training set. Then for each of the methods over each of the data sets, the detection threshold was varied and at each threshold the detection rate and false positive rate were computed. For each algorithm over each data set an ROC curve was obtained.

The parameter settings are as follows. For the cluster-based algorithm 100, when processing the network connection data, the width of the fixed-width clustering was set to be 40 in the feature space. For the eject system call traces, the width was set to be 5. For the ps traces, the width was set to be 10.

For the k-nearest neighbor-based algorithm 200, for the KDD cup data, the value of k was set to 10,000. For the eject data set, k=2 and for the ps data set, k=15. The value of k is adjusted to the overall size of the data.

For the SVM-based algorithm 300 for the KDD cup data, the following values were set: $v=0.01$ and $\sigma^2=12$. For the system call data sets, values of $v=0.05$ and $\sigma^2=1$ were used. (The parameters were used above, in which $v$ is the control parameter, and $\sigma^2$ is the tuning parameter.)

The analysis was performed on a computer system, such as a standard PC running the UNIX operating system. The algorithms described herein may also be used in a special purpose device with general computational capabilities (cpu and memory) such as a network interface card (e.g., an Intel™ IXP 1200) or a network router appliance (such as a CISCO™ router as a functional blade) or an intrusion detection appliance (such as NFR NIDS).

In the case of the system call data, each of the algorithms described above performed perfectly. Thus, at a certain threshold, there was at least one process trace from each of the (k-nearest neighbor), and 300 (SVM) described herein. All three algorithms perform relatively close to each other.

TABLE 2

| Algorithm | Detection rate | False positive rate |
|---|---|---|
| Cluster 100 | 93% | 10% |
| Cluster 100 | 66% | 2% |
| Cluster 100 | 47 | % |
| Cluster 100 | 28% | .5% |
| K-NN 200 | 91% | 8% |
| K-NN 200 | 23% | 6% |
| K-NN 200 | 11% | 4% |
| K-NN 200 | 5% | 2% |
| SVM 300 | 98% | 10% |
| SVM 300 | 91% | 6% |
| SVM 300 | 67% | 4% |
| SVM 300 | 5% | 3% |

It will be understood that the foregoing is only illustrative of the principles of the invention, and that various modifications can be made by those skilled in the art without departing from the scope and spirit of the invention.

APPENDIX

The software listed herein is provided in an attached CD-Rom. The contents of the CD-Rom are incorporated by reference in their entirety herein.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

1.0 Clustering System
    Step 1. Setting Up.
    To use the system for detecting network intrusions, the training data must be in the proper format. Data should be in the KDD format. (See Section 1.2 KDD Format, below.) The training data is organized as follows: Choose a root name (root). Then put the attribute information in root.names and the actual instance data into root.data.
    Step 2. Converting the Data.
    The data should be converted into normalized format before the system can cluster it. To do this, the conversion program should be run by typing:
        java conv [root]
where [root] is the data's root name. This step will produce two files: root.conv and root.stat. The file root.conv contains the converted data, which will be used for clustering. The file root.stat contains statistical information gathered about the data (average and standard deviation).
    Step 3. Clustering:
    To perform the actual clustering, the clustering program should be run:
        java clst [root]
This step will produce a root.cls file, which is a binary file containing the saved clusters. The .cls file is actually a serialized saved copy of the clusters and the clustering class. Note, that for this step the following files must be present:
    root.names
    root.conv
    root.stat
    If it is desired to modify how the program clusters the data (including changing the metric, cluster method, cluster method parameters), the clst.java program may be modified. (See the Section 1.3 below.)
    Detecting Anomalies or Intrusions:
    Once the training data has been clustered, the system can be used to classify data instances (having the same number and types of attributes as the training data). For an example of detecting anomalies, see the file test1.java. That program takes as parameters the name of the .cls (saved cluster information) file, and the root name of the data to be classified (detect anomalies/intrusions in), and performs the following:
    Creates an InstanceReader object to read the data to classify.
InstanceReader inst_reader=new DefaultInstReader(root, root+".data");
    Loads the clusters (deserializes a TCluster object).
TCluster clusters=TCluster.load(clsfile);
    Labels the clusters based on number of instances in them (here it labels the largest 10% of all clusters)
clusters.label_clusters (10);
    Retrieves the average and standard deviation information from the clusters (this is the average and standard deviation of the training data from which the clusters were created). This is needed to convert the instances that are to be classified next.
Inst avg_inst=clusters.avg_inst;
Inst std_inst=clusters.std_Inst;
    Reads instances one by one, until the end of file.
Inst inst=inst_reader.read_next_instance( );
if(inst==null)break;
    Converts those instances based on the average and standard deviation information.
inst=conv.convert(inst,avg_inst,std_inst);
    And finally, asks the clusters to classify the instance as an anomaly or not
int c=clusters.is_anomaly(inst);

The implementation may of course differ, in that, for example, instances may be classified in real-time as they arrive from the network, instead of reading the from a file. In this case, the parse_inst function of DefaultInstanceReader class may be used to return an Inst object from a string representation (comma delimited, in KDD format) of an instance.
1.2 KDD Format.
    Data File:
    A data file in the KDD is basically a text file that has a data instance on each line. Each data instance is a comma delimited set of values (one value for every attribute). The last value on the line must be the classification, followed by a period. For example, here are the first few lines from a sample data file:
    0,tcp,http,SF,181,7051,2,2,19,255,normal.
    0,tcp,http,SF,183,2685,12,12,29,255,normal.
    0,udp,private,SF,105,146,45,1,255,255,normal.
    If the classification is not known, then there should be at least one # character before the final period. For example:
    0,udp,private,SF,105,146,45,1,255,255,#.
    Attribute (.Names) File
    An attribute file specifies the names and types of attributes for the instances in the data. The first line is a comma delimited line of the possible classification values. The next lines contain the attribute descriptions in this format:
    <attribute_name>: <type>. (:<weight>)
The type may be either "symbolic" or "continuous". The optional weight parameter is the weight of this attribute. It should be a positive real number. If it is not specified, the default weight is 1.00.
    Here is an example attribute description (.names) file:
    back,buffer_overflow,ftp_write
    duration: continuous.:.4
    protocol_type: symbolic.
    service: symbolic.
    flag: symbolic.:
    src_bytes: continuous.
    dst_bytes: continuous.:.1
    land: symbolic.
    wrong_fragment: continuous.:.9
1.3 Descriptions of the Classes
    Inst and Attr Classes:
    The Inst class, located in Inst.java, is the container class for a single data instance. When data in KDD format is read from a file, the DefaultInstanceReader class (described below) parses each line in the file and returns an Inst object for it.
    To parse the lines and to create those Inst objects, it also requires information about the attributes of the data instances. The container for this information is the Attr class—it stores the attributes' names and types. This information is obtained from the .names file (by DefaultInstanceReader (see below) upon construction).
    InstanceReader Interface and the DefaultInstReader Class:
    Both the InstanceReader interface and the DefaultInstanceReader class are located in InstanceReader.java.
    The InstanceReader interface is used for reading in the data. Its definition provides the methods and their descriptions. There are methods for reading in the next instance, for resetting back to the beginning of file, for getting the Attr object with the attributes information, and for getting statistical information (this will return valid information only if .stat file is present—which is generated by Conv.java program).
    The DefaultInstReader class is a default implementation of the InstanceReader interface. It reads the data stored in KDD format, with the root.data (root.conv), root.names, and root- .stat files present. To use it, construct it by passing the 'root' name for the data, and the name of the file containing the actual instance data (should either be root.data or root.conv). For example, if the root name is "training", and the data was already converted into normalized format (so that the "training.conv" and "training.stat" file are created), the object may be constructed as below:

InstanceReader reader=new DefaultInstReader("training","training.conv");

Getting an Inst Object from a String Representation of a Single Instance:

Sometimes (e.g., during detection phase in real time), it might be necessary to get a single Inst object from a string representation of a single instance in the standard KDD format. To do this, the static parse_inst( ) method of DefaultInstanceReader is used. Pass to it the following: the string representation and the attributes object for the data.

The TCluster Class:

The TCluster class, located in cl.java, is the base class for all the clustering algorithm classes. It contains methods for creating clusters out of the data, for labeling the clusters, and for classifying an instance as an anomaly or not based on the clusters.

It is an abstract class because the implementation of how clustering will be performed is up to the concrete derived class. The abstract method 'void cluster_instances(InstanceReader reader)' must be overridden by the derived class to implement its own clustering behavior.

The SLCluster Class:

The SLCluster class, located in SLCluster.java, implements Single Linkage clustering. To use it, construct it by passing a Metric to use, and the width of the clusters. (The Metric interface will be described below.) An example is provided below:

TCluster clusters=new SLCluster(new Std_metric( ), 1.00);

The KMCluster Class:

The KMCluster class, located in KMCluster.java, implements K-means clustering. To use it, construct it by passing a Metric to use, the value of K (i.e., the number of clusters), and the number of maximum iterations to do. If the maximum iterations parameter is negative, iterations will be performed until no changes in the K clusters occur between iterations. An example is provided below:

TCluster clusters=new KMCluster(new Std_metric( ), 100, 70);

Once the TCluster object is created, it can be used to create clusters and classify instances. Below are several methods of the TCluster class:

public void do_clustering(InstanceReader reader) throws IOException

This method is called to create the clusters. Pass in an instance reader for reading the instances.

public static TCluster load(String name)
public void save(String name)

Once the clusters have been created, they may be saved to a file (by serialization) and loaded in. The above methods do that (the name parameter is the file name to save to or load from).

public void label_clusters(int pct_biggest)

To proceed to the detection phase, and use the cluster information, the above method is called to label the clusters as either anomalous or non-anomalous (normal). The pct_biggest argument specifies the percent of the biggest clusters (biggest in terms of the number of instances in them) that should be labeled as normal. For example label_clusters(10), specifies that 0.1 of the biggest clusters will be normal, and so any instance that will be nearest to any one of them will also be considered normal. All the other clusters will be labeled anomalous.

public int is_anomaly(Inst inst)

Finally, an instance may be classified an anomaly or not. An instance is passed to the method above, and it will return "1" if it classifies the instance as an anomaly, and "0" otherwise. (Note that the instance must be converted to normalized form before passing it to this method.) See the section "Conv Class" below for information on how to convert it.

Metric Interface and the Std_Metric Class

Both of the above are defined in Metric.java. The Metric interface must be passed to the clustering algorithm, so that it will know how to compute distances between instances. The interface defines just one method:

public double Calc_Distance(Inst a,Inst b);

It should return the square of the distance between the two passed instances. A default implementation of the Metric interface is provided by the Std_metric class. It treats instances as data points in an n-coordinate space (where n is the number of attributes), and computes the Euclidean distance between them. The 'difference' between two values of a symbolic attribute is set to be 1.00 if they are different and 0.00 if they are the same.

Different attributes might also be weighted differently, in which Std_metric multiplies the difference for each attribute by the respective weight.

Conv Class

The Conv class handles conversion of instance data into normalized form. It includes a main( ) method, so it is a standalone program. See Section 1.0 for information on using this program. It also includes a method for converting a single instance to a normalized form. If the instances are being read from non-normalized data, then they must be converted before calling the is_anomaly( ) method of TCluster class. To do this, call the following static function of Conv class:

static Inst convert(Inst inst, Inst avg_inst, Inst std_inst)

The first parameter is the instance you want to convert, and the second and third parameters are the average and standard deviation of the data which was used to obtain the clusters. To obtain them, retrieve them from the TCluster object loaded from the saved clusters data. For example, if 'clusters' was the name of the TCluster object that was loaded, then Inst avg_inst=clusters.avg_inst;
Inst std_inst=clusters.std_inst;

would obtain the instances containing the average and standard deviation information needed. See the test1.java program for an example of doing this.

Examples The programs clst.java and test1.Java, described above, provide examples of using the classes described above. The 'clst' program takes the data and clusters it, and saves the clusters information in a file. The 'test1' program loads the saved clusters and classifies instances using them.

2.0 k-Nearest Neighbor Algorithm

The routines in the attached files knn.cpp and knn.h perform the k nearest neighbor routine substantially as described above concerning embodiment 200.

3.0 SVM Algorithm

Description of contents of one_class_svm: B. Schölkopf, J. Platt, J. Shawe-Taylor, A. J. Smola, and R. C. Williamson. Estimating the support of a high-dimensional distribution. Technical Report 99-87, Microsoft Research, 1999. To appear in Neural Computation, 2001. Section 4, pages 9-11, are basically what svm.c implements, with some modification for unsupervised anomaly detection as described hereinabove.

Directory: vector/takes feature vectors of the data as input. The following files are located in the directory vector:

vector/data/train_kdd_10000: 9999 feature vectors of 41 features each, with a classification, used for training vector/data/test_kdd_10000: 9999 feature vectors of 41 features each, with a classification, used for testing vector/result/kdd_05_12_000001: Output of the svm, given a certain V and C (kernel width—note that this is defined differently in the code than in the equations above) False Positive Rate and Detection Rate given a specified threshold vector/Makefile: Used to compile svm.c vector/run: Used to run svm over certain data with certain parameters of V and C (kernel width), and precision vector/svm.c: The C source code which, when compiled, computes a single class svm over the training data and classifies the testing data, and outputs the results: False Positive Rate and Detection Rate for a certain threshold. (Run with no arguments for more explanation of command line options)

Directory: matrix/takes a pre-computed kernel matrix as input. The following files are located in the directory matrix:

matrix/data/eject.dat: Pre-computed kernel matrix of eject data matrix/data/ftpd.dat: Pre-computed kernel matrix of ftpd data matrix/data/ps.dat: Pre-computed kernel matrix of ps data matrix/result/eject.svm: For eject data. Output of the svm, given input data and a certain V (C not necessary since kernel is already computed) Distance of each data point from the hyperplane given a specified threshold matrix/result/eject.raw: As above, with labels matrix/result/eject.roc: Points of the ROC curve given eject.raw as data points matrix/result/ftpd.svm: For ftpd data. Output of the svm, given input data and a certain V (C not necessary since kernel is already computed) Distance of each data point from the hyperplane given a specified threshold matrix/result/ftpd.raw: As above, with labels matrix/result/ftpd.roc: Points of the ROC curve given ftpd.raw as data points matrix/result/ps.svm: For ps data. Output of the svm, given input data and a certain V (C not necessary since kernel is already computed) Distance of each data point from the hyperplane given a specified threshold matrix/result/ps.raw: As above, with labels matrix/result/ps.roc: Points of the ROC curve given ps.raw as data points matrix/Makefile: Used to compile svm_matrix.c matrix/run: Used to run svm over certain data with certain parameters of V and C (kernel width), and precision matrix/svm_matrix.c: The C source code which, when compiled, computes a single class svm using the kernel matrix. It then runs the matrix over the computed svm again and calculates and outputs the distance of each data point from the hyperplane. (Run with no arguments for more explanation of command line options)

| Name | Modified | Size | Packed | Path |
| --- | --- | --- | --- | --- |
| Root | 12/04/2002 3:41 PM | 17 | 17 | ml\CVS\ |
| Repository | 12/04/2002 3:41 PM | 3 | 3 | ml\CVS\ |
| Entries | 12/05/2002 12:56 PM | 20 | 20 | ml\CVS\ |
| knn.cpp | 12/04/2002 5:14 PM | 13,360 | 13,360 | ml\knn\ |
| knn.h | 12/04/2002 5:14 PM | 1,889 | 1,889 | ml\knn\ |
| Root | 12/05/2002 12:57 PM | 17 | 17 | ml\one_class_svm\...\CVS\ |
| Repository | 12/05/2002 12:57 PM | 21 | 21 | ml\one_class_svm\...\CVS\ |
| Entries | 12/05/2002 1:00 PM | 91 | 91 | ml\one_class_svm\...\CVS\ |
| eject.dat | 12/04/2002 11:00 PM | 1,140 | 1,140 | ml\one_class_svm\...\data\ |
| ftpd.dat | 12/04/2002 11:00 PM | 6,880,794 | 6,880,794 | ml\one_class_svm\...\data\ |
| ps.dat | 12/04/2002 11:00 PM | 280,093 | 280,093 | ml\one_class_svm\...\data\ |
| Root | 12/05/2002 12:58 PM | 17 | 17 | ml\one_class_svm\...\CVS\ |
| Repository | 12/05/2002 12:58 PM | 29 | 29 | ml\one_class_svm\...\CVS\ |
| Entries | 12/05/2002 1:00 PM | 124 | 124 | ml\one_class_svm\...\CVS\ |
| Makefile | 12/04/2002 11:00 PM | 1,291 | 1,291 | ml\one_class_svm\...\matrix\ |
| eject.raw | 12/04/2002 11:00 PM | 163 | 163 | ml\one_class_svm\...\rslt\ |
| eject.roc | 12/04/2002 11:00 PM | 23 | 23 | ml\one_class_svm\...\rslt\ |
| eject.svm | 12/04/2002 11:00 PM | 143 | 143 | ml\one_class_svm\...\rslt\ |
| ftpd.raw | 12/04/2002 11:00 PM | 12,566 | 12,566 | ml\one_class_svm\...\rslt\ |
| ftpd.roc | 12/04/2002 11:00 PM | 14 | 14 | ml\one_class_svm\...\rslt\ |
| ftpd.svm | 12/04/2002 11:00 PM | 12,501 | 12,501 | ml\one_class_svm\...\rslt\ |
| ps.raw | 12/04/2002 11:00 PM | 2,776 | 2,776 | ml\one_class_svm\...\rslt\ |
| ps.roc | 12/04/2002 11:00 PM | 27 | 27 | ml\one_class_svm\...\rslt\ |
| ps.svm | 12/04/2002 11:00 PM | 2,772 | 2,772 | ml\one_class_svm\...\rslt\ |
| Root | 12/05/2002 12:58 PM | 17 | 17 | ml\one_class_svm\...\CVS\ |
| Repository | 12/05/2002 12:58 PM | 29 | 29 | ml\one_class_svm\...\CVS\ |
| Entries | 12/05/2002 1:00 PM | 368 | 368 | ml\one_class_svm\...\CVS\ |
| run | 12/04/2002 11:00 PM | 99 | 99 | ml\one_class_svm\...\matrix\ |
| svm_matrix.c | 12/04/2002 11:00 PM | 18,707 | 18,707 | ml\one_class_svm\...\matrix\ |
| Root | 12/05/2002 12:57 PM | 17 | 17 | ml\one_class_svm\...\CVS\ |
| Repository | 12/05/2002 12:57 PM | 24 | 24 | ml\one_class_svm\...\CVS\ |
| Entries | 12/05/2002 1:00 PM | 144 | 144 | ml\one_class_svm\...\CVS\ |
| Readme | 12/05/2002 12:53 PM | 3,548 | 3,548 | ml\one_class_svm\ |
| test_kdd_10000 | 12/04/2002 11:00 PM | 3,383,967 | 3,383,967 | ml\one_class_svm\...\data\ |
| train_kdd_10000 | 12/04/2002 11:00 PM | 3,383,563 | 3,383,563 | ml\one_class_svm\...\data\ |
| Root | 12/05/2002 12:58 PM | 17 | 17 | ml\one_class_svm\...\CVS\ |
| Repository | 12/05/2002 12:58 PM | 29 | 29 | ml\one_class_svm\...\CVS\ |
| Entries | 12/05/2002 1:00 PM | 97 | 97 | ml\one_class_svm\...\CVS\ |
| Makefile | 12/04/2002 11:00 PM | 1,277 | 1,277 | ml\one_class_svm\vector\ |
| kdd_05_12_00001 | 12/04/2002 11:00 PM | 704,009 | 704,009 | ml\one_class_svm\v...\rslt\ |
| Root | 12/05/2002 12:58 PM | 17 | 17 | ml\one_class_svm\...\CVS\ |
| Repository | 12/05/2002 12:58 PM | 29 | 29 | ml\one_class_svm\...\CVS\ |
| Entries | 12/05/2002 1:00 PM | 51 | 51 | ml\one_class_svm\...\CVS\ |

-continued

| Name | Modified | Size | Packed | Path |
|---|---|---|---|---|
| run | 12/04/2002 11:00 PM | 150 | 150 | ml\one_class_svm\vector\ |
| svm.c | 12/04/2002 11:00 PM | 25,646 | 25,646 | ml\one_class_svm\vector\ |
| Root | 12/05/2002 12:57 PM | 17 | 17 | ml\one_class_svm\ . . . \CVS\ |
| Repository | 12/05/2002 12:57 PM | 24 | 24 | ml\one_class_svm\ . . . \CVS\ |
| Entries | 12/05/2002 1:00 PM | 137 | 137 | ml\one_class_svm\ . . . \CVS\ |
| Root | 12/05/2002 12:56 PM | 17 | 17 | ml\one_class_svm\ . . . \CVS\ |
| Repository | 12/05/2002 12:56 PM | 17 | 17 | ml\one_class_svm\ . . . \CVS\ |
| Entries | 12/05/2002 1:00 PM | 75 | 75 | ml\one_class_svm\ . . . \CVS\ |
| Attr.java | 12/04/2002 3:47 PM | 4,075 | 4,075 | ml\cluster\code\ |
| clst.java | 12/04/2002 3:47 PM | 470 | 470 | ml\cluster\code\ |
| conv.java | 12/04/2002 3:47 PM | 6,645 | 6,645 | ml\cluster\code\ |
| Inst.java | 12/04/2002 3:47 PM | 7,481 | 7,481 | ml\cluster\code\ |
| InstanceReader.java | 12/04/2002 3:47 PM | 5,667 | 5,667 | ml\cluster\code\ |
| KMCluster.java | 12/04/2002 3:47 PM | 39,772 | 39,772 | ml\cluster\code\ |
| Metric.java | 12/04/2002 3:47 PM | 1,486 | 1,486 | ml\cluster\code\ |
| SLCluster.java | 12/04/2002 3:47 PM | 3,760 | 3,760 | ml\cluster\code\ |
| TCluster.java | 12/04/2002 3:47 PM | 9,041 | 9,041 | ml\cluster\code\ |
| test1.java | 12/04/2002 3:41 PM | 3,050 | 3,050 | ml\cluster\code\ |
| km.java | 12/04/2002 3:47 PM | 472 | 472 | ml\cluster\code\ |
| 1.gif | 12/04/2002 3:47 PM | 1,089 | 1,089 | ml\cluster\doc\ |
| km.txt | 12/04/2002 3:47 PM | 125,581 | 125,581 | ml\cluster\doc\ |
| sll.bd | 12/04/2002 3:47 PM | 289,317 | 289,317 | ml\cluster\doc\ |
| thesis.zip | 12/04/2002 3:47 PM | 22,811 | 22,811 | ml\cluster\doc\ |

What is claimed is:

1. A method for unsupervised detection of an anomaly in the operation of a computer system comprising:
    (b) mapping a set of unlabeled data instances, which do not indicate any anomaly occurrence, to a feature space;
    (c) calculating one or more sparse regions in the feature space; and
    (d) designating one or more data instances from the set of unlabeled data instances as an anomaly if said one or more data instances is located in said one or more sparse regions of the feature space.

2. The method of claim 1, wherein receiving the set of unlabeled data instances comprises receiving the set of unlabeled data instances from an audit stream.

3. The method of claim 2, wherein receiving the set of unlabeled data instances comprises receiving a set of system call trace data.

4. The method of claim 2, wherein receiving the set of unlabeled data instances comprises receiving a set of network connections records data.

5. The method of claim 4, wherein receiving the set of unlabeled data instances comprises receiving a sequence of TCP packets.

6. The method of claim 5, wherein the features of the TCP packets comprise at least one of a duration of the network connection, a protocol type, and number of byte transferred by the connection, and an indication of the status of the connection.

7. The method of claim 1, wherein implicitly mapping the set of unlabeled data instances comprises implicitly mapping the set of unlabeled data instances to a vector space.

8. The method of claim 1, wherein implicitly mapping the set of unlabeled data instances comprises normalizing the set of unlabeled data instances based on respective values of features of the set of unlabeled data instances.

9. The method of claim 8, further comprising normalizing each data instance in the set of unlabeled data instances based on a corresponding number of standard deviations of each data instance from a mean of the set of unlabeled data instances.

10. The method of claim 1, wherein implicitly mapping the set of unlabeled data instances comprises applying a convolution kernel to the set of unlabeled data instances.

11. The method of claim 10, wherein applying a convolution kernel comprises applying a spectrum kernel to the set of unlabeled data instances.

12. The method of claim 1, further comprising, after implicitly mapping the set of unlabeled data instances to a feature space, associating each data instance in the set of unlabeled data instances with one of a plurality of clusters.

13. The method of claim 12, further comprising, determining a distance between a selected data instance and a nearest cluster in the plurality of clusters.

14. The method of claim 13, further comprising, if the distance between the selected data instance and the nearest cluster is less than or equal to a predetermined cluster width, associating the selected data instance with the selected cluster.

15. The method of claim 13, further comprising, if the distance between the selected data instance and the selected cluster is greater than the cluster width, creating a new cluster and associating the selected data instance with the new cluster.

16. The method of claim 12, further comprising, determining a percentage of clusters having the greatest number of data instances respectively associated therewith.

17. The method of claim 16, wherein the percentage of clusters having the greatest number of data instances are labeled as dense regions in the feature space and wherein the remaining clusters are labeled as sparse regions in the feature space.

18. The method of claim 17, wherein designating one or more data instances as an anomaly comprises associating each data instance in the set of unlabeled data instances with a respective cluster.

19. The method of claim 1, further comprising, determining a sum of distances between a selected data instance and k nearest data instances to the selected data instance, wherein k is a predetermined value.

20. The method of claim 19, wherein determining the sum of the distances comprises determining a nearest cluster as a cluster corresponding to a shortest distance between the respective center of the cluster and the selected data instance.

21. The method of claim 20, further comprising, if a distance between the selected data instance and each data instance in the nearest cluster is less than a predetermined minimum distance, designating the point the cluster as one of the k nearest neighbors.

22. The method of claim 21, wherein designating one or more data instances as an anomaly comprises determining whether sum of the distances to the k nearest neighbors exceeds a predetermined threshold.

23. The method of claim 1, wherein designating one or more data instances as an anomaly comprises determining a decision function to separate the set of data instances from an origin and computing the decision function.

* * * * *